(12) United States Patent
Bromberg et al.

(10) Patent No.: US 10,182,593 B2
(45) Date of Patent: Jan. 22, 2019

(54) POROUS CATALYTIC MATRICES FOR ELIMINATION OF TOXICANTS FOUND IN TOBACCO COMBUSTION PRODUCTS

(75) Inventors: Lev E. Bromberg, Swampscott, MA (US); Trevor A. Hatton, Sudbury, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 63 days.

(21) Appl. No.: 14/236,085

(22) PCT Filed: Aug. 1, 2012

(86) PCT No.: PCT/US2012/049170
§ 371 (c)(1),
(2), (4) Date: Jul. 8, 2014

(87) PCT Pub. No.: WO2013/019865
PCT Pub. Date: Feb. 7, 2013

(65) Prior Publication Data
US 2014/0311507 A1    Oct. 23, 2014

Related U.S. Application Data

(63) Continuation-in-part of application No. 13/195,378, filed on Aug. 1, 2011.

(51) Int. Cl.
*A24D 3/08* (2006.01)
*A24D 3/02* (2006.01)
(Continued)

(52) U.S. Cl.
CPC ............. *A24D 3/0287* (2013.01); *A24D 3/10* (2013.01); *A24D 3/16* (2013.01); *B01J 20/226* (2013.01);
(Continued)

(58) Field of Classification Search
USPC ... 556/1, 2, 27, 57, 110, 118, 138, 170, 178; 131/31, 334; 428/116, 402, 304.4;
(Continued)

(56) References Cited

U.S. PATENT DOCUMENTS 6,713,076 B1    3/2004  Hill et al.
7,338,421 B2 *  3/2008  Eusepi ................. A24D 3/0225
                                                         493/39
(Continued)

FOREIGN PATENT DOCUMENTS

EP    1 439 261        7/2004
JP    2010240332 A    10/2010
(Continued)

OTHER PUBLICATIONS

Fowles, Jefferson et al, "The Chemical Constituents in Cigarettes and Cigarette Smoke: Priorities for Harm Reduction", A Report to the New Zealand Ministry of Health, 2000, 66 pages, [online], retrieved from the Internet, [retrieved Jan. 18, 2017]. <URL: http://www.moh.govt.nz/moh.nsf/pagescm/1003/$File/chemicalconstituentscigarettespriorities.pdf>.*

(Continued)

*Primary Examiner* — Dennis R Cordray
(74) *Attorney, Agent, or Firm* — Foley Hoag LLP; Dana Gordon; Alexander Chatterley

(57) ABSTRACT

Described herein are compositions and methods for capturing carbonylic or phenolic toxicants, or converting these toxicants into less volatile compounds. The toxicants, which may be a component of cigarette smoke, may be captured by physical or chemical adsorption, absorption, or entrapment.

20 Claims, 18 Drawing Sheets

(51) Int. Cl.
*A24D 3/16* (2006.01)
*B01J 20/22* (2006.01)
*A24D 3/10* (2006.01)
*B01J 20/28* (2006.01)
*B01J 20/32* (2006.01)

(52) U.S. Cl.
CPC ..... *B01J 20/28038* (2013.01); *B01J 20/3208* (2013.01); *B01J 20/3265* (2013.01)

(58) Field of Classification Search
USPC ............... 502/150, 170; 423/210, 230, 245.1
See application file for complete search history.

(56) References Cited

U.S. PATENT DOCUMENTS

| | | | |
|---|---|---|---|
| 7,901,619 | B2 | 3/2011 | Mueller et al. |
| 8,647,419 | B2 * | 2/2014 | Kaskel ............... A62D 5/00 2/457 |
| 8,697,191 | B2 * | 4/2014 | Gaab ............... D21H 19/02 427/372.2 |
| 2004/0094173 | A1 | 5/2004 | Ishikawa et al. |
| 2004/0094174 | A1 | 5/2004 | Ishikawa et al. |
| 2008/0190289 | A1 | 8/2008 | Muller et al. |
| 2009/0263621 | A1 | 10/2009 | Chang et al. |
| 2010/0108083 | A1 | 5/2010 | Schwartz |
| 2012/0255569 | A1 | 10/2012 | Beard et al. |

FOREIGN PATENT DOCUMENTS

| | | |
|---|---|---|
| WO | WO-98/28074 | 7/1998 |
| WO | WO-99/53131 | 10/1999 |
| WO | WO-2007/035596 | 3/2007 |
| WO | WO-2008/125990 | 10/2008 |
| WO | WO 2008/125990 A2 * | 10/2008 |
| WO | WO-2008143385 A1 | 11/2008 |
| WO | WO 2009/056184 A1 * | 7/2009 |

OTHER PUBLICATIONS

Definition of Hybrid. The Free Dictionary by Farlex, No Date, [online], retrieved from the Internet, [retrieved Nov. 27, 2017], <URL:https://www.thefreedictionary.com/hybrid>.*

International Search Report dated Jan. 28, 2013 from PCT/US2012/049170.

Juan-Alcaniz et al., "Building MOF bottles around phosphotungstic acid ships: One-pot synthesis of bi-functional polyoxometalate-MIL-101 catalysts," J Catal, 269(1):229-241 (2010).

Bromberg et al., "Heterpolyacid-Functionalized Aluminum 2-Aminoterephthalate Metal_Organic Frameworks as Reactive Aldehyde Sorbents and Catalysts," ACS Applied Materials and Interfaces, 5: 5468-5476 (2013).

Bromberg et al., "Aldehyde Self_Condensation Catalysis by Aluminum Aminoterephthalate Metal-Organic Frameworks Modified With Aluminum Isopropoxide," Chem Materials, 25: 1636-1642 (2013).

Bromberg et al., "Chromium(III) terephthalate Metal Organic Framework (MIL-101): HF-Free Synthesis, Structure, Polyoxometalate Composites, and Catalytic Properties," Chem Materials, 24: 1664-1675 (2012).

Bromberg et al., "Aldehyde-Alcohol reactions Catalyzed under Mild Conditions by Chromium(III) Terephthalate Metal Organic Framework (MIL-101) and Phosphotungstic Acid Composites," ACS Applied Materials and Interfaces, 3: 4756-4764 (2011).

* cited by examiner 14-phenyl-14H-dibenzo[a,j]xanthene

| Synthesis method | Yield [a] (wt%) | C/Cr content (wt%/wt%) | Weight-average hydrodynamic diameter (nm) [b] | BET surface area ($m^2/g$) [c] | Langmuir surface area ($m^2/g$) [c] | Average pore diameter (nm) [c,d] |
|---|---|---|---|---|---|---|
| Microwave | 55 | 48.1/10.3 | 312±20 | 4004 | 5510 | 3.5 |
| Autoclave | 64 | 45.7/11.1 | 396±4 | 3460 | 4710 | 3.6 |

| Sample | BET surface area ($m^2/g$) [a] | Average pore diameter (nm) [a] | Keggin ion content (wt%) [b] |
|---|---|---|---|
| MIL/PTA$_{ja}$ | 860 | 2.3 | 30.5 |
| MIL/PTA$_{imp}$ | 1020 | 2.4 | 30.9 |

Figure 9

| Reaction | Catalyst (loading, wt% or mol%)[a] | T (°C) | MW[c] time (min) | Yield (wt%)[d] |
|---|---|---|---|---|
| Synthesis of dibenzoxanthene from benzaldehyde (B) and 2-naphthol (N). Initial B:N mol ratio, 1:2. | No catalyst | 60 | 2 | 0 |
| | No catalyst | 90 | 10 | <3 |
| | MIL-101 (4.8)[e] | 80 | 2 | 5-10 |
| | MIL-101 (9.2) | 90 | 10 | 32 |
| | MIL101/PTA$_{imp}$ (4.8) | 60 | 2 | 83 |
| | MIL101/PTA$_{imp}$ (9.2) | 60 | 2 | 92 |
| | MIL101/PTA$_{imp}$ (9.2) | 90 | 2 | 96 |
| | MIL101/PTA$_{ja}$(4.8) | 60 | 2 | 80 |
| | MIL101/PTA$_{ja}$(9.2) | 90 | 2 | 96 |
| | PTA (2.4/0.11)[b] | 90 | 2 | 96 |

Figure 10

| Parameter | MIL-101 | MIL101/PTA$_{imp}$ | MIL101/PTA$_{ja}$ |
|---|---|---|---|
| Average Keggin ion content (wt%)[a] | 0 | 30.9 | 30.5 |
| Particle size (nm)[b] | 396±4 | 390±11 | 2000-10000 |
| Average pore diameter (nm)[c] | 3.6 | 2.4 | 2.3 |
| BET surface area (m$^2$/g)[c] | 3460 | 1020 | 860 |

| Catalyst | $C_{cat}$ (mM) | $t_{1/2}$ (min) | $k \times 10^3$ ($M^{-1}min^{-1}$) | TON[d] | TOF ($min^{-1}$) |
|---|---|---|---|---|---|
| PTA | 1.7[a] | 16 | 21 | 170 | 8.5 |
| MIL101/PTA$_{imp}$ | 0.52[b] | 26 | 17 | 630 | 17 |
| MIL101/PTA$_{ja}$ | 0.52[b] | 31 | 15 | 630 | 14 |
| MIL-101 | 10[c] | 127 | 1.7 | 30 | 0.18 |

Benzaldehyde dimethyl acetal

| Catalyst | $C_{cat}$ (mM) | $k_{obs}$ x $10^3$ (min$^{-1}$) | $t_{1/2}$ (min)$^d$ | TON$^e$ | TOF (min$^{-1}$) |
|---|---|---|---|---|---|
| PTA | 0.49$^a$ | 11 | 61 | 930 | 11 |
| MIL101/PTA$_{imp}$ | 0.15$^b$ | 7.1 | 98 | 2930 | 22 |
| MIL101/PTA$_{ja}$ | 0.15$^b$ | 5.7 | 120 | 2920 | 18 |
| MIL-101 | 2.8$^c$ | 1.1 | 630 | 140 | 0.19 |

Figure 21

| Cycle No. | Total catalyst recovery (wt%)[a] | | | Keggin ion content (wt%)[b] | | Cr content (wt%)[b] | $k \times 10^3$ (M$^{-1}$min$^{-1}$) or $k_{obs} \times 10^3$ (min$^{-1}$)[c] | | |
|---|---|---|---|---|---|---|---|---|---|
| | MIL101/ PTA$_{imp}$ | MIL101/ PTA$_{ja}$ | MIL -101 | MIL101/ PTA$_{imp}$ | MIL101/ PTA$_{ja}$ | MIL-101 | MIL101/ PTA$_{imp}$ | MIL101/ PTA$_{ja}$ | MIL- 101 |
| Acetaldehyde-phenol reaction | | | | | | | | | |
| 1 | 93 | 94 | 93 | 30.9 | 30.5 | 11.1 | 17 | 15 | 1.7 |
| 2 | 88 | 87 | 88 | 29.1 | 28.3 | 11.4 | 18 | 13 | 1.8 |
| 3 | 82 | 83 | 82 | 25.3 | 27.1 | 11.5 | 15 | 14 | 1.5 |
| 4 | 81 | 83 | 82 | 25.2 | 27.1 | 11.2 | 16 | 14 | 1.6 |
| Benzaldehyde-methanol reaction | | | | | | | | | |
| 1 | 93 | 94 | 95 | 30.9 | 30.8 | 11.1 | 7.1 | 5.7 | 1.1 |
| 2 | 92 | 87 | 91 | 29.0 | 29.4 | 11.1 | 7.2 | 6.0 | 1.0 |
| 3 | 89 | 83 | 93 | 26.5 | 28.1 | 11.1 | 7.1 | 5.7 | 1.1 |
| 4 | 84 | 81 | 91 | 26.2 | 28.0 | 10.9 | 7.1 | 5.7 | 0.9 |

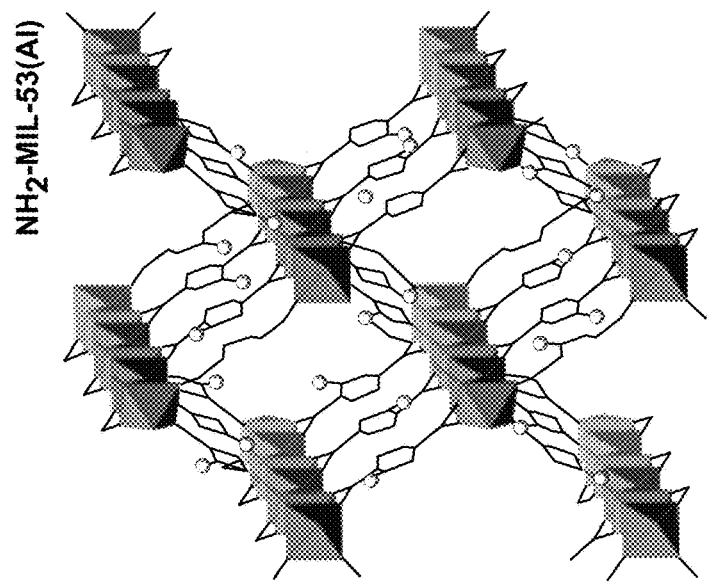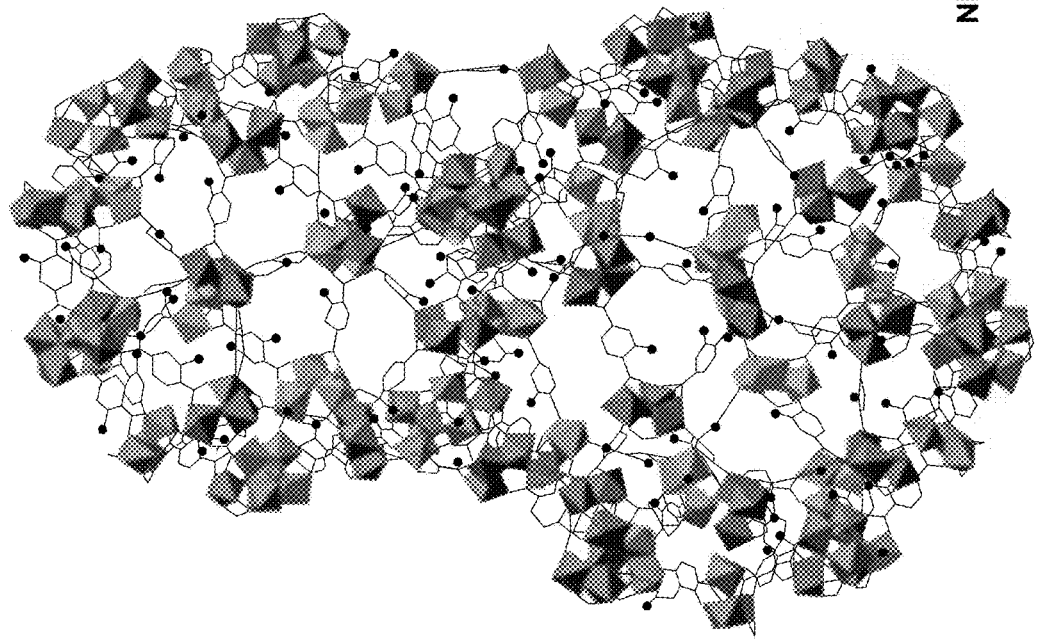
FIG. 22

Figure 27
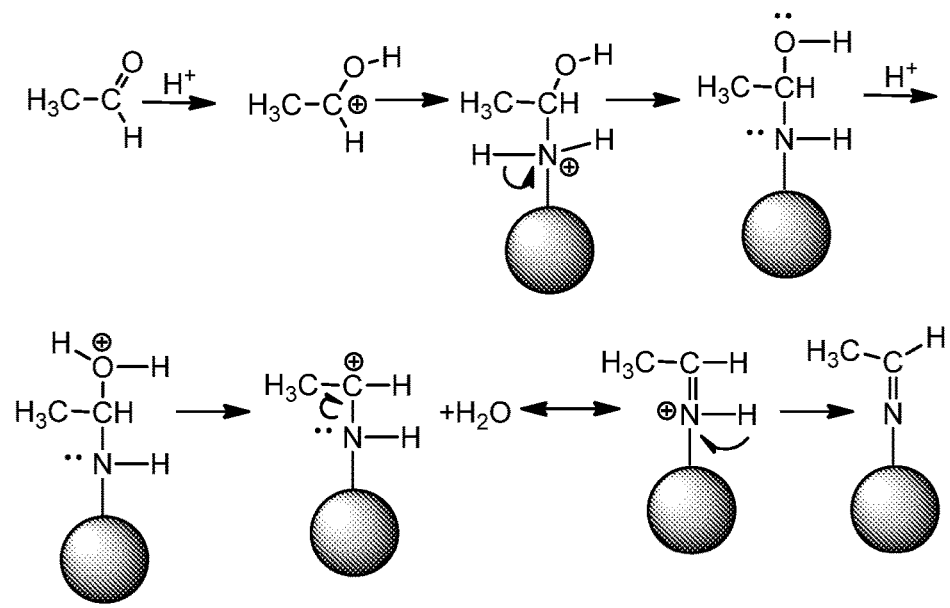
-The reaction can be accelerated by PTA
-Imine formation on MOF with aldehyde binding
Heat-promoted reaction between PTA and MOF
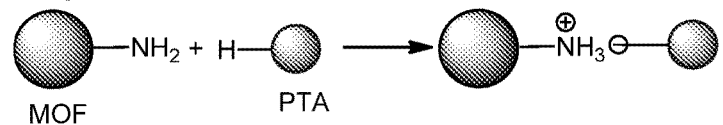

2-ATA     2,4-toluene diisocyanate

POROUS CATALYTIC MATRICES FOR ELIMINATION OF TOXICANTS FOUND IN TOBACCO COMBUSTION PRODUCTS

RELATED APPLICATIONS

This application is the U.S. National Stage of International Application No. PCT/US12/049170, filed Aug. 1, 2012, which is a continuation-in-part application of U.S. patent application Ser. No. 13/195,378, filed Aug. 1, 2011.

BACKGROUND

Cigarette smoking is believed to contribute to or cause roughly 30% of all cancer deaths. Cigarette smoke contains more than 3500 chemicals, at least 50 of which are carcinogens. Carbonyls, including acetaldehyde, acrolein (propenal), formaldehyde, and others, are formed through the pyrolysis of tobacco. Accordingly, these compounds are among the compounds present at high levels in cigarette smoke. In fact, acetaldehyde and acrolein are present in international brands of cigarettes at concentrations of 860 and 83 µg/mg of nicotine, respectively. The Scientific Basis of Tobacco Product Regulation, WHO Technical Report Series 951, World Health Organization, Geneva, Switzerland, 2008. Long-term exposure to formaldehyde, acrolein, and acetaldehyde is known to increase the risk of asthma and cancer.

Cigarette smoke and tar also contain other carcinogens, such as polycyclic aromatic alcohols, which initiate the formation of cancer. Co-carcinogens in cigarette smoke, such as phenols, have also been identified; co-carcinogens accelerate the production of cancer by other initiators. Many phenols, naphthols and other co-carcinogens are also irritants.

The World Health Organization (WHO) has recommended mandated lowering of allowable levels of these toxicants in cigarettes. Current methods of reducing the amount of a toxicant in cigarette smoke include incorporation of transition metal oxide clusters, such as clusters of scandium, titanium, vanadium, chromium, manganese, iron, cobalt, nickel, copper, and oxides and mixtures thereof. The nano-sized clusters or nanoparticles of metal oxide are capable of catalyzing the conversion (oxidation) of carbon monoxide (CO) to carbon dioxide ($CO_2$), or adsorbing carbon monoxide itself. The clusters are incorporated into a component of a smoking article, wherein the component is selected from the group consisting of tobacco cut filler, cigarette paper and cigarette filter material. See U.S. Pat. No. 7,712,471, incorporated herein by reference in its entirety. However, this reference not disclose any methods for reducing the levels of toxicants other than CO in the cigarette smoke.

Another method of reducing toxicants in cigarette smoke is disclosed in U.S. Pat. No. 6,615,843, hereby incorporated by reference in its entirety. This patent discloses a tobacco smoke filter synergistic composition comprised of antioxidants, such as ascorbic or citric acid, butylparaben, glutathione, melatonin, resveratrol, selenium, ubiquinones, or green tea, and adsorptive "minerals," such as activated carbon, clinoptilolite, cuprous chloride, and ferrite. The antioxidants are effective as scavengers in reducing free radicals from the cigarette smoke, while activated carbon or similar adsorbent 'minerals' adsorb substantial levels of volatiles. However, U.S. Pat. No. 6,615,843 does not disclose any catalytic conversion of the volatile carbonylic compounds or phenols into less volatile chemicals. No catalytic condensation reactions of phenols and aldehydes found as toxicants in the cigarette smoke were disclosed.

Separately, metal-organic frameworks (MOF), constituted by metal ions or metal ion clusters occupying nodal framework positions coordinated with di- or multi-podal organic ligands, are rapidly emerging as an important family of crystalline materials to be utilized as catalysts in organic reactions. Some of these MOFs are crystalline materials with the lowest framework densities and the highest pore volume known to date. Among over 10,000 MOF materials, there are several transition-metal MOFs that are stable under liquid-phase reaction conditions. These include mesoporous chromium (III) terephthalate (MIL-101), which possesses acceptable resistance to water, common solvents, and temperatures (up to 320° C.). MIL-101 has a rigid zeotype crystal structure, consisting of 2.9 and 3.4-nm quasi-spherical cages accessible through windows of ca. 1.2 and 1.6 nm, respectively. Due to the high stability, MIL-101 exhibits no detectable leaching of chromium into solutions, allowing its safe use in different applications. In addition, MIL-101 possess a high density of chromium ions (three per elementary cell) with Lewis acid properties, which can be stable under reaction conditions. The open-pore structure of MIL-101 can be further functionalized by Pd or Au nanoparticles and polyoxometalate (POM) anions. The resulting composite materials are effective catalysts for hydrogenation reactions and oxidation reactions. Another POM material that can be utilized to functionalize the MIL-101 framework is phosphotungstic acid (PTA). PTA is the strongest known heteropolyacid. MIL-101/PTA composite materials (MIL101/PTA) have been shown to catalyze (i) the oxidation on of alkenes using molecular oxygen and aqueous hydrogen peroxide as oxidants, (ii) $H_2O_2$-based alkene epoxidations, (iii) the Knoevenagel condensation of benzaldehyde and ethyl cyanoacetate, (iv) liquid and gas-phase acid-catalyzed esterifications (acetic acid with n-butanol, methanol dehydration), and (v) and carbohydrate dehydration.

SUMMARY OF THE INVENTION

In certain embodiments, the invention relates to a method of reducing the quantity of a toxicant in a fluid, comprising
   contacting the fluid with a MOF matrix,
   wherein
   the MOF matrix comprises metal ions or clusters coordinated to polydentate organic ligands;
   the fluid is a gas; and
   the toxicant is a carbonylic compound or a phenolic compound.

In certain embodiments, the invention relates to any one of the aforementioned methods, wherein the fluid is tobacco smoke.

In certain embodiments, the invention relates to a method of adsorbing or absorbing a carbonylic compound or a phenolic compound, comprising
   contacting the carbonylic compound or phenolic compound with a MOF matrix, wherein the MOF matrix comprises metal ions or clusters coordinated to polydentate organic ligands.

In certain embodiments, the invention relates to a method of catalyzing the conversion of a carbonylic compound to a non-carbonylic product, comprising
   contacting the carbonylic compound with a MOF matrix for an amount of time, thereby forming the non-carbonylic product, wherein the MOF matrix comprises metal ions or clusters coordinated to polydentate organic ligands.

In certain embodiments, the invention relates to a method of catalyzing the conversion of a phenolic compound to a non-phenolic product or a polymeric product, comprising contacting the phenolic compound with a MOF matrix for an amount of time, thereby forming the non-phenolic product or the polymeric product, wherein the MOF matrix comprises metal ions or clusters coordinated to polydentate organic ligands.

BRIEF DESCRIPTION OF THE FIGURES

FIG. 9 tabulates Baeyer condensations of aldehyde and β-naphthol catalyzed by MOF MIL-101 and its polyoxometalate composites and PTA. [a] In all cases, except for catalysis with phosphotungstic acid (PTA), the catalyst loading is given in wt %. The loading is calculated as 100× catalyst weight/sum of weight of all components in the initial reaction mixture. [b] PTA loading is given in wt %/mol %. The content in mol % is calculated as 100× mols of catalyst/sum of mols of each component in the initial reaction mixture. [c] MW is the time of microwaving, wherein specified temperature is held within the reaction tube. [d] Series of independent experiments conducted in triplicate demonstrated standard deviations of the yield determination to be within ±5 wt %. [e] MIL-101 samples prepared using autoclaving method are used throughout.

FIG. 10 tabulates properties of MIL-101 metal organic framework and MIL101/PTA composite materials synthesized by impregnation of MIL-101 by PTA in water (MIL101/PTA$_{imp}$) or by joint autoclaving of the MIL-101 components and PTA in deionized water (MIL101/PTA$_{ja}$). [a] Obtained from elemental analysis and calculations based on Keggin structure ($H_3PW_{12}O_{40}$). [b] Measured by dynamic light scattering in particle suspension in methanol. [c] Determined from nitrogen adsorption isotherms.

vs time (equation (2)).

Figures 15, 16:
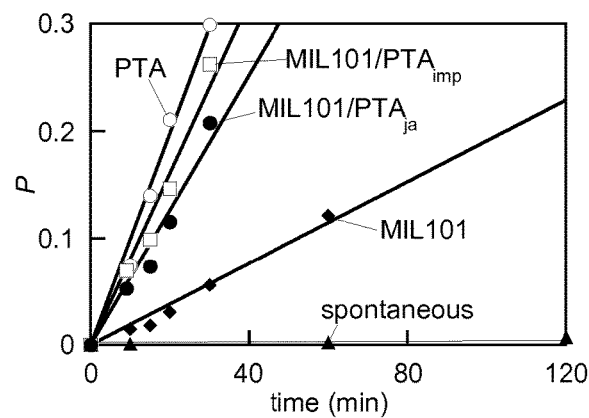
FIG. 15 depicts a plot of the initial kinetics of acetaldehyde conversion in the Baeyer acetaldehyde-phenol condensation expressed in terms of $$P = \frac{\ln C_a}{q + C_{a0}} - \frac{\ln C_a}{q + C_a}$$

FIG. 16 tabulates effective catalyst concentration ($C_{cat}$), reaction half-life ($t_{1/2}$), kinetic rate constant, and turnover frequency (TOF) of the acetaldehyde-phenol condensation conducted in THF-$d_8$ at 25° C. and $C_{a0}=C_{pi}$=0.33 M. [a] Concentration of PTA in solution. [b] Concentration of PTA in the MIL101/PTA calculated per L of the suspension. [c] Total concentration of the Brønsted and Lewis acid cites per L of the suspension. [d] Calculated from the expression TON=$C_{a0}$× F/$C_{cat}$. Here, F (equation (1)) is measured at 10 h after the reaction commencement.

Figure 17:
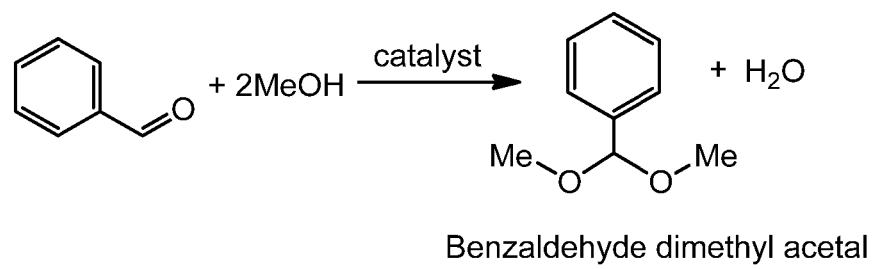

FIG. 17 depicts a schematic showing the reaction between benzaldehyde and methanol.

Figure 18:
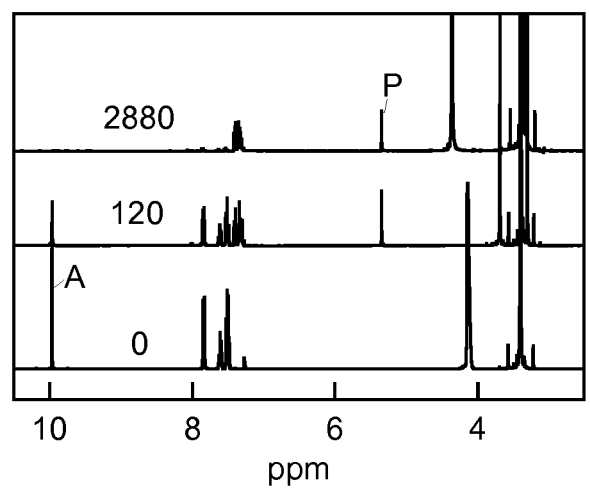

FIG. 18 depicts typical $^1$H NMR spectra illustrating the kinetics of the reaction of benzaldehyde acetalization by methanol catalyzed by MIL101/PTA$_{ja}$ at 25° C. Initial concentrations of methanol and benzaldehyde are $C_{mi}$=23.5 and $C_{b0}$=0.474 M, respectively. Samples of the reaction mixture withdrawn at timepoints indicated were dissolved in CDCl$_3$ at 2:5 vol/vol ratio after catalyst separation. Numbers stand for time in minutes since the reaction commencement. Letters A and P indicate the aldehyde (substrate) and product signals, respectively.

Figures 19, 20:
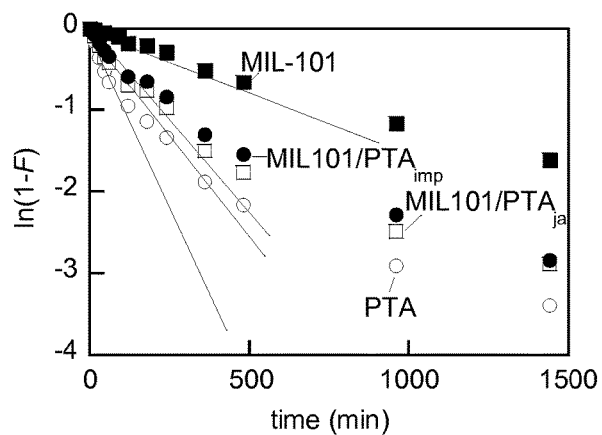

FIG. 19 depicts a kinetic plot of benzaldehyde conversion in its acetalization by methanol catalyzed by MIL-101, MIL101/PTA$_{ja}$, MIL101/PTA$_{imp}$ and PTA at 25° C. The straight lines illustrate the initial reaction rates and are shown to guide the eye only.

FIG. 20 tabulates the effective catalyst concentration ($C_{cat}$), observed rate constant ($k_{obs}$), reaction half-life ($t_{1/2}$), and turnover frequency (TOF) of the acetalization of benzaldehyde with methanol conducted at 25° C. and $C_{b0}$=0.474 M, $C_{mi}$=23.5 M. [a] Concentration of PTA in solution. [b] Concentration of PTA in the MIL101/PTA calculated per L of the suspension. [c] Total concentration of the Brønsted and Lewis acid cites per L of the suspension. [d] Calculated from the expression $t_{1/2}=\ln(2)/k_{obs}$. [e]Calculated from the expression TON=$C_{b0}\times F/C_{cat}$. Here, F (eqn (4)) is measured at 24 h after the reaction commencement.

FIG. 21 tabulates total catalyst recovery, Keggin ion content, Cr content and kinetic rate constants measured in 4 cycles of catalyst reuse. Each cycle consisted of 1 day of the catalytic reaction at 25° C., catalyst recovery, workup and reuse as described. [a]Calculated as 100× mass of catalyst in n-th cycle/initial mass of catalyst. [b]Measured by elemental analysis in each cycle. [c]Rate constants k and $k_{obs}$ are measured in the acetaldehyde-phenol and benzaldehyde-methanol reactions, respectively.

FIG. 22 depicts structures of $NH_2$-MIL-101(Al) (left) showing larger and smaller spherical pores and $NH_2$-MIL-53(Al) (right). The inorganic cluster is represented by grey-colored octahedron, the amino group is represented by a sphere.

Figure 23:
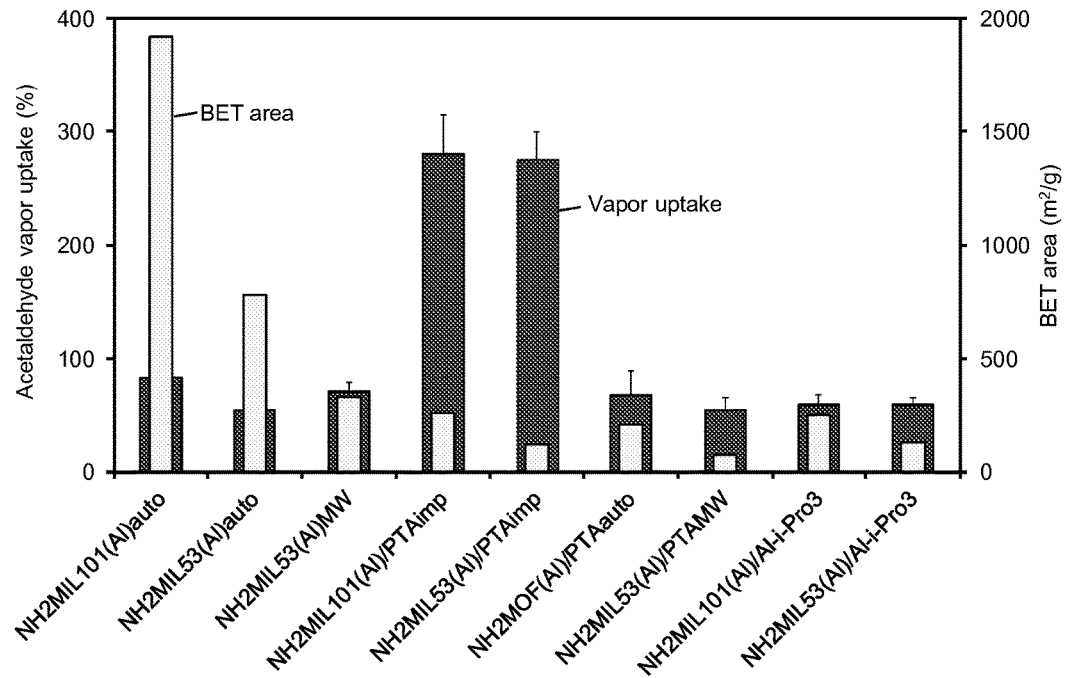

FIG. 23 depicts acetaldehyde vapor uptake at 25° C. and BET area of MOFs. See the text for MOF designations.

Figure 24:
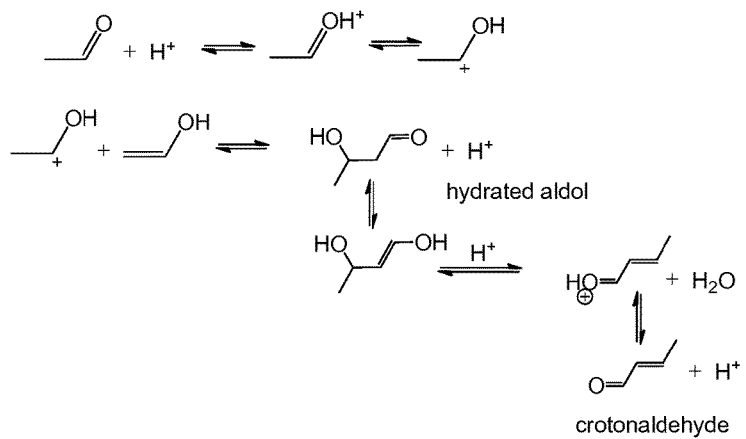

FIG. 24 depicts the aldol condensation of acetaldehyde catalyzed by PTA.

Figure 25:
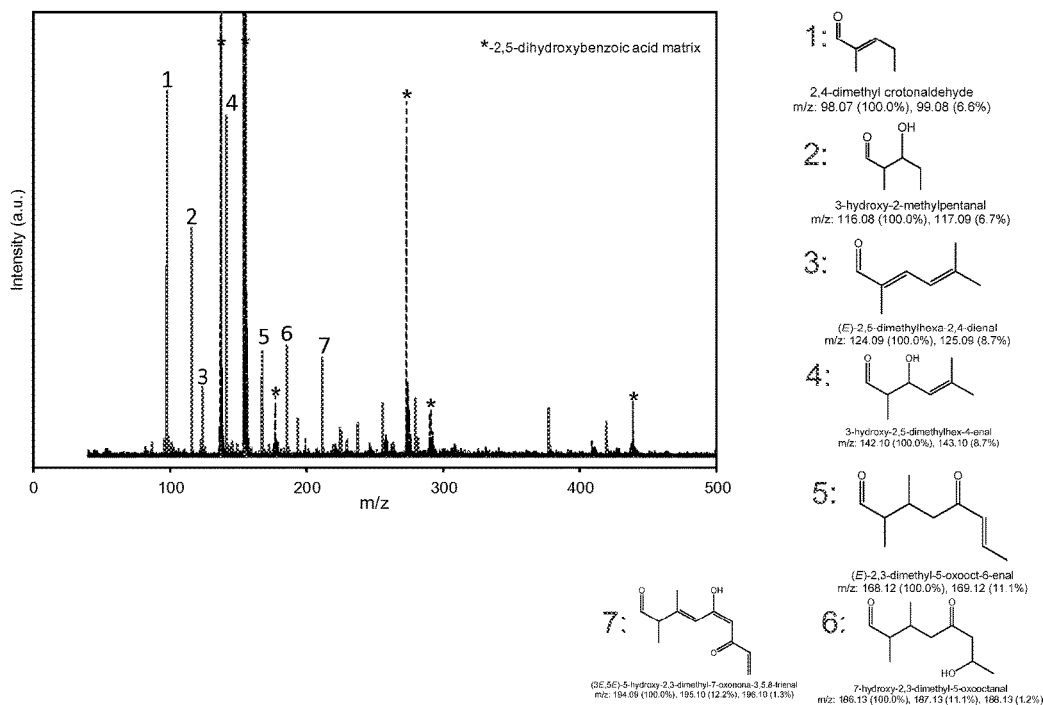

FIG. 25 depicts MALDI-TOF spectrum of the sorbate extract from $NH_2MIL101(Al)/PTA_{imp}$ sample equilibrated with acetaldehyde vapor at 25° C. Asterisk shows peaks belonging to the DHB matrix, whereas numbers stand for identified compounds of acetaldehyde conversion. The identified compounds are shown in the insets.

Figure 26:
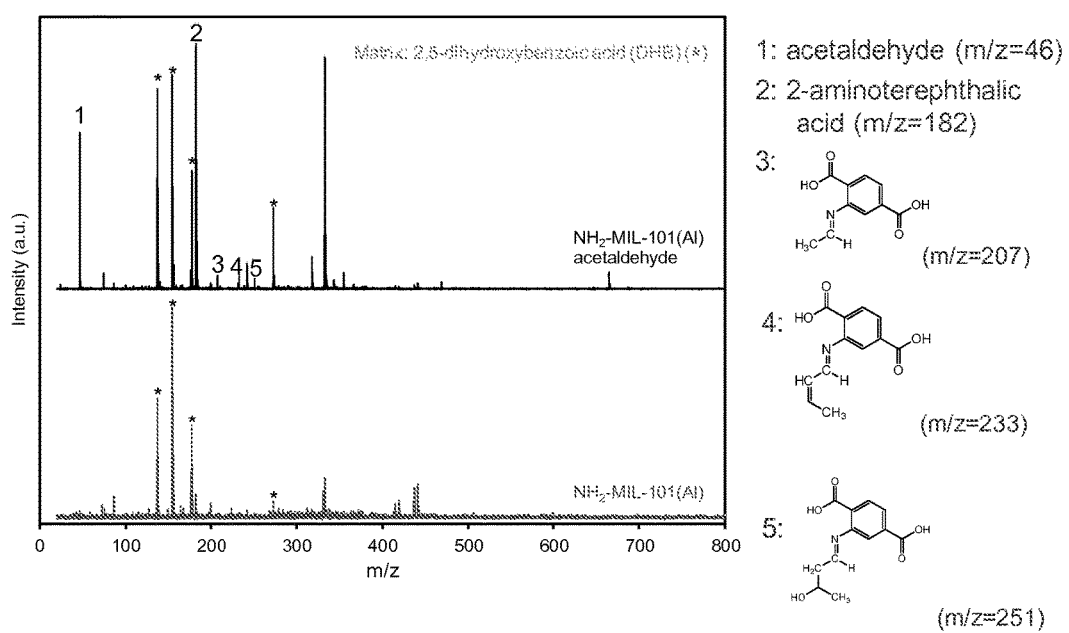

FIG. 26 depicts MALDI-TOF spectrum of the aqueous solution of $NH_2MIL101(Al)/PTA_{imp}$ reacted with acetaldehyde vapor at 25° C. for 24 h. Asterisks shows peaks of the DHB matrix, whereas numbers stand for identified compounds.

FIG. 27 depicts the mechanism of the acetaldehyde-amine/MOF condensation leading to the formation of imine groups.

Figure 28:
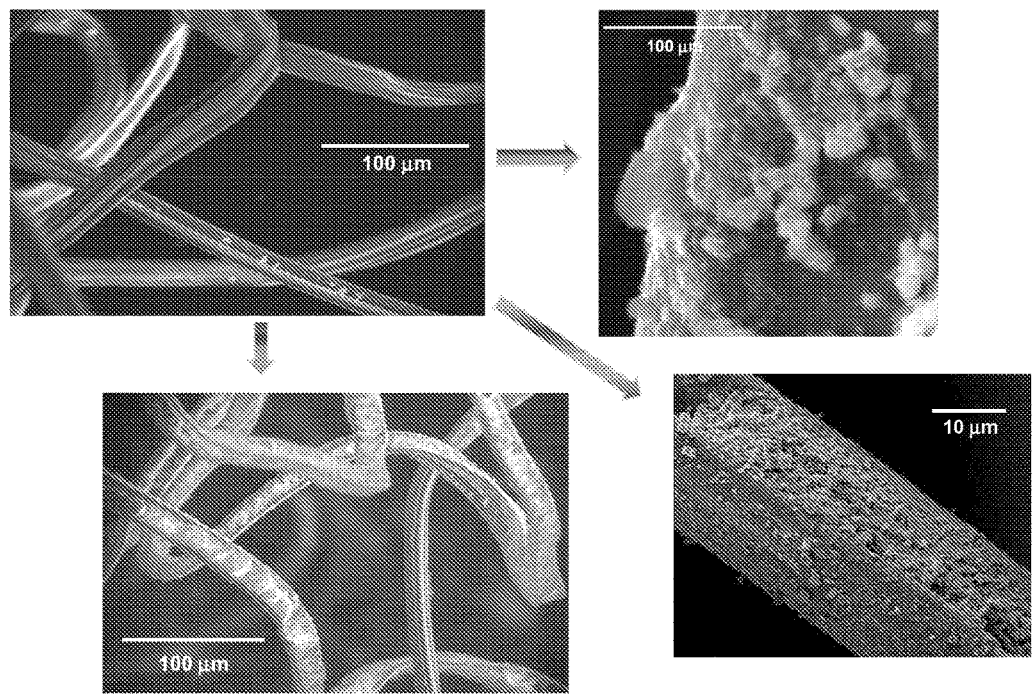

FIG. 28 depicts SEM images illustrating coating of the cellulose acetate fibers (PMI) with MOF particles. Uncoated fibers are shown in the left upper image.

Figure 29:
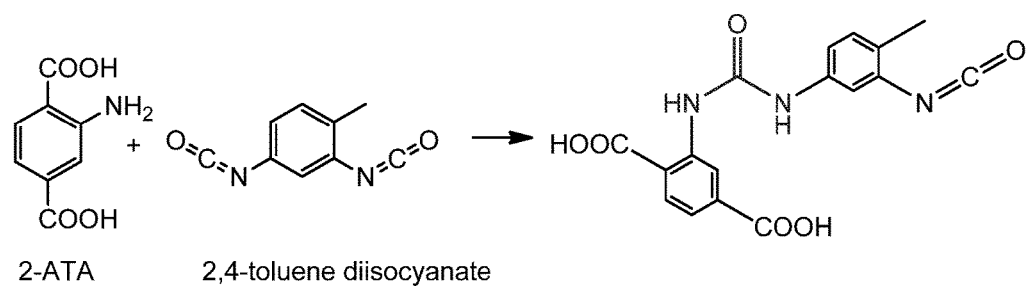

FIG. 29 depicts a schematic of the reaction between 2-aminoterephthalic acid of MOF and TDI.

Figure 30:
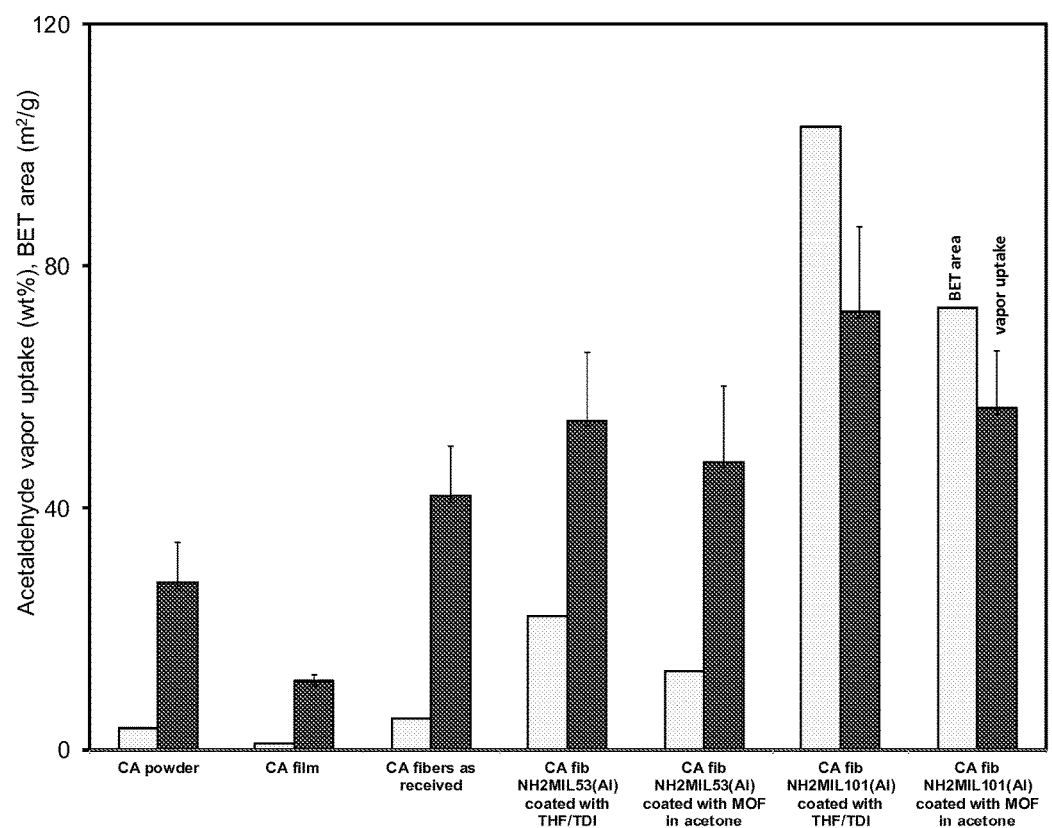

FIG. 30 depicts acetaldehyde vapor uptake and BET surface area of cellulose acetate (CA) fibers, CA film cast from acetone, and CA fibers modified by MOF materials. The vapor uptake was measured for 24 h at 25° C.

DETAILED DESCRIPTION

Overview

In certain embodiments, the present invention relates to materials and methods for filtering tobacco smoke. In certain embodiments, the present invention relates to materials and methods for filtering cigarette smoke. In certain embodiments, the materials are capable of capturing toxicant vapors and particles, and tar and other health-damaging materials, arising from the combustion of tobacco.

In certain embodiments, the invention relates to a method of capturing and converting carbonylic compounds into less volatile compounds. In certain embodiments, the capturing occurs via physical or chemical adsorption, absorption, or entrapping toxicant components of the cigarette smoke and smoke constituents.

In certain embodiments, the invention relates to a filter to be used by a person smoking tobacco, wherein the filter is capable of reducing the amount of contaminants in smoke passing through the filter (i.e., into the person's mouth).

In certain embodiments, the invention relates to a method of filtering tobacco smoke. In certain embodiments, the method combines absorption and catalytic reduction of the noxious components of the smoke.

Exemplary Matrices of the Invention

Overview

In certain embodiments, the invention relates to a metal-organic framework (MOF) matrix. In certain embodiments, the invention relates to any one of the aforementioned MOF matrices, wherein the MOF matrix comprises metal ions or clusters coordinated to organic ligands. In certain embodiments, the invention relates to any one of the aforementioned MOF matrices, wherein the MOF matrix comprises metal ions or clusters coordinated to polydentate organic ligands.

In certain embodiments, the invention relates to any one of the aforementioned MOF matrices, wherein the MOF matrix comprises at least one, at least bidentate, organic ligand bound by coordination to at least one metal ion. In certain embodiments, the invention relates to any of the MOF matrices described in U.S. Pat. No. 5,648,508 or U.S. Pat. No. 7,842,827, both of which are hereby incorporated by reference in their entireties.

In certain embodiments, the invention relates to any one of the aforementioned MOF matrices, wherein the MOF matrix comprises MIL-101 or MIL101/PTA. MIL-101 is a chromium terephthalate-based mesoscopic metal-organic framework and one of the most porous materials reported to date.

In certain embodiments, the invention relates to any one of the aforementioned MOF matrices, wherein the MOF matrix comprises MIL-101, strongly acidic MIL-101, or MIL101/PTA. In certain embodiments, the invention relates to any one of the aforementioned MOF matrices, wherein the MOF matrix is MIL-101, strongly acidic MIL-101, or MIL101/PTA.

In certain embodiments, the invention relates to any one of the aforementioned MOF matrices, wherein the MOF matrix is selected from the group consisting of MOF-177, MOF-178, MOF-74, MOF-235, MOF-236, MOF-69 to 80, MOF-501, MOF-502, and MOF-101. In certain embodiments, the invention relates to any one of the aforementioned MOF matrices, wherein the MOF matrix is selected from the group consisting of MOF-2 to 4, MOF-9, MOF-31 to 36, MOF-39, MOF-69 to 80, MOF103 to 106, MOF-122, MOF-125, MOF-150, MOF-177, MOF-178, MOF-235, MOF-236, MOF-500, MOF-501, MOF-502, MOF-505, IRMOF-1, IRMOF-61, IRMOP-13, IRMOP-51, MIL-17, MIL-45, MIL-47, MIL-53, MIL-59, MIL-60, MIL-61, MIL-63, MIL-68, MIL-79, MIL-80, MIL-83, MIL-85, CPL-1 to 2, and SZL-1.

Exemplary Metal Components of Matrices of the Invention

In certain embodiments, the invention relates to any one of the aforementioned MOF matrices, wherein the metal ion or cluster comprises a metal atom of group Ia, IIa, IIIa, IVa to VIIIa, or Ib to VIb. In certain embodiments, the invention relates to any one of the aforementioned MOF matrices, wherein the metal ion or cluster comprises Mg, Ca, Sr, Ba, Sc, Y, Ti, Zr, Hf, V, Nb, Ta, Cr, Mo, W, Mn, Re, Fe, Ro, Os, Co, Rh, Ir, Ni, Pd, Pt, Cu, Ag, Au, Zn, Cd, Al, Ga, In, Tl, Si, Ge, Sn, Pb, or Bi. In certain embodiments, the invention relates to any one of the aforementioned MOF matrices, wherein the metal ion or cluster comprises Zn, Cu, Ni, Pd, Pt, Ru, Rh, or Co. In certain embodiments, the invention relates to any one of the aforementioned MOF matrices, wherein the metal ion or cluster comprises Cr, Fe, Zn, Al, Ni, or Cu.

In certain embodiments, metal ions or clusters are described in U.S. Pat. No. 5,648,508, hereby incorporated by reference in its entirety.

Exemplary Organic Ligands of the Invention

In certain embodiments, the invention relates to any one of the aforementioned MOF matrices, wherein the polydentate organic ligand is an organic ligand that is attached to a central metal ion by bonds from two or more donor atoms. In certain embodiments, the polydentate organic ligand is bidentate, tridentate, or tetradentate.

In certain embodiments, the invention relates to any one of the aforementioned MOF matrices, wherein the term "at least bidentate organic compound" designates an organic compound that comprises at least one functional group that is able to form, to a given metal ion, at least two coordinate bonds, or to two or more metal atoms, in each case one coordinate bond. In certain embodiments, the organic compound is able to form three coordinate bonds to one metal atom. In certain embodiments, the organic compounds is able to form one coordinate bond to each of three metal atoms.

In certain embodiments, the invention relates to any one of the aforementioned MOF matrices, wherein the organic ligand comprises a functional group selected from the group consisting of —COOH, —NO$_2$, —B(OH)$_2$, —SO$_3$H, —Si(OH)$_3$, —Ge(OH)$_3$, —Sn(OH)$_3$, —Si(SH)$_3$, —PO$_3$H, —CH(RNH$_2$)$_2$, —C(RNH$_2$)$_3$, —CH(ROH)$_2$, —R(OH)$_3$, —CH(RCN)$_2$, —C(RCN)$_3$,

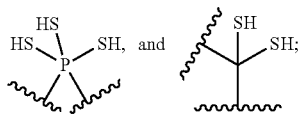 [SMILES: *P(*)(S)(S)S ; "and" ; *C(*)(S)S]

and R is an alkylene group having 1, 2, 3, 4, or 5 carbon atoms, or an arylene group comprising 1 or 2 aromatic nuclei. In certain embodiments, the invention relates to any one of the aforementioned MOF matrices, wherein R is methylene, ethylene, n-propylene, i-propylene, n-butylene, i-butylene, tert-butylene, or n-pentylene. In certain embodiments, the invention relates to any one of the aforementioned MOF matrices, wherein R comprises two phenylene rings. In certain embodiments, the invention relates to any one of the aforementioned MOF matrices, wherein R comprises a heteroarylene group, wherein the heteroatom is N, O, or S. In certain embodiments, the invention relates to any one of the aforementioned MOF matrices, wherein R is substituted by at least in each case one substituent. In certain embodiments, R is not present. In certain embodiments, the invention relates to any one of the aforementioned MOF matrices, wherein the organic ligand comprises a functional group selected from the group consisting of —CH(SH)$_2$, —C(SH)$_3$, —CH(NH$_2$)$_2$, —C(NH$_2$)$_3$, —CH(OH)$_2$, —C(OH)$_3$, —CH(CN)$_2$ and —C(CN)$_3$.

In certain embodiments, the invention relates to any one of the aforementioned MOF matrices, wherein the organic ligand is derived from a saturated or unsaturated aliphatic compound, an aromatic compound, or a compound that is both aliphatic and aromatic.

In certain embodiments, the invention relates to any one of the aforementioned MOF matrices, wherein the organic ligand is trans-muconic acid, fumaric acid, or phenylenebisacrylic acids.

In certain embodiments, the invention relates to any one of the aforementioned MOF matrices, wherein the organic ligand is an optionally at least monosubstituted mono-, di-, tri-, tetranuclear, or higher nuclear aromatic, di-, tri- or tetracarboxylic acid. In certain embodiments, the invention relates to any one of the aforementioned MOF matrices, wherein any of the aromatic nuclei is a heteroaromatic nuclei. In certain embodiments, the invention relates to any one of the aforementioned MOF matrices, wherein the organic ligand is a mononuclear dicarboxylic acid, mononuclear tricarboxylic acid, mononuclear tetracarboxylic acid, dinuclear dicarboxylic acid, dinuclear tricarboxylic acid, dinuclear tetracarboxylic acid, trinuclear dicarboxylic acid, trinuclear tricarboxylic acid, trinuclear tetracarboxylic acid, tetranuclear dicarboxylic acid, tetranuclear tricarboxylic acid, or tetranuclear tetracarboxylic acid. In certain embodiments, the invention relates to any one of the aforementioned MOF matrices, wherein any of the aromatic nuclei is a heteroaromatic nuclei. In certain embodiments, the invention relates to any one of the aforementioned MOF matrices, wherein any of the aromatic nuclei is a heteroaromatic nuclei; and the heteroatom is N, O, S, B, P, Si, or Al. In certain embodiments, the invention relates to any one of the aforementioned MOF matrices, wherein any of the aromatic nuclei is a heteroaromatic nuclei; and the heteroatom is N, S or O. In certain embodiments, the invention relates to any one of the aforementioned MOF matrices, wherein the organic ligand is substituted; and the substituent is —OH, —NO$_2$, amino, alkyl, or alkoxy.

In certain embodiments, the invention relates to any one of the aforementioned MOF matrices, wherein the organic ligand is a dicarboxylic acid, including but not limited to asoxalic acid, succinic acid, tartaric acid, 1,4-butanedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecanedicarboxylic acid, heptadecanedicarboxylic acid, acetylenedicarboxylic acid, 1,2-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diaminophenylmethane-3,3'-dicarboxylic acid, quinoline-3,4-dicarboxylic acid, 7-chloro-4-hydroxyquinoline-2,8-dicarboxylic acid, diimidodicarboxylic acid, pyridine-2,6-dicarboxylic acid, 2-methylimidazole-4,5-dicarboxylic acid, thiophene-3,4-dicarboxylic acid, 2-isopropylimidazole-4,5-dicarboxylic acid, tetrahydropyran-4,4-dicarboxylic acid, perylene-3,9-dicarboxylic acid, perylenedicarboxylic acid, Pluriol E 200-dicarboxylic acid, 3,6-dioxaoctanedicarboxylic acid, 3,5-cyclohexadiene-1,2-dicarboxylic acid, octadicarboxylic acid, pentane-3,3-carboxylic acid, 4,4'-diamino-1,1'-diphenyl-3,3'-dicarboxylic acid, 4,4'-diaminodiphenyl-3,3'-dicarboxylic acid, benzidine-3,3'-dicarboxylic acid, 1,4-bis(phenylamino)benzene-2,5-dicarboxylic acid, 1,1'-dinaphthyl-S,S'-dicarboxylic acid, 7-chloro-8-methylquinoline-2,3-dicarboxylic acid, 1-anilinoanthraquinone-2,4'-dicarboxylic acid, polytetrahydrofuran-250-dicarboxylic acid, 1,4-bis(carboxymethyl)piperazine-2,3-dicarboxylic acid, 7-chloroquinoline-3,8-dicarboxylic acid, 1-(4-carboxy)phenyl-3-(4-chloro)phenylpyrazoline-4,5-dicarboxylic acid, 1,4,5,6,7,7-hexachloro-5-norbornene-2,3-dicarboxylic acid, phenylindanedicarboxylic acid, 1,3-dibenzyl-2-oxoimidazolidine-4,5-dicarboxylic acid, 1,4-cyclohexanedicarboxylic acid, naphthalene-1,8-dicarboxylic acid, 2-benzoylbenzene-1,3-dicarboxylic acid, 1,3-dibenzyl-2-oxoimidazolidine-4,5-cis-dicarboxylic acid, 2,2'-biquinoline-4,4'-dicarboxylic acid, pyridine-3,4-dicarboxylic acid, 3,6,9-trioxaundecanedicarboxylic acid, O-hydroxybenzophenonedicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, 4,4'-diaminodiphenyletherdiimidodicarboxylic acid, 4,4'-diaminodiphenylmethanediimidodicarboxylic acid, 4,4'-diaminodiphenylsulfonediimidodicarboxylic acid, 2,6-naphthalenedicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenecarboxylic acid, 8-sulfo-2,3-naphthalenedicarboxylic acid, anthracene-2,3-dicarboxylic acid, 2',3'-diphenyl-p-terphenyl-4,4''-dicarboxylic acid, diphenyl-ether-4,4'-dicarboxylic acid, imidazole-4,5-dicarboxylic acid, 4(1H)-oxothiochromene-2,8-dicarboxylic acid, 5-tert-butyl-1,3-benzenedicarboxylic acid, 7,8-quinolinedicarboxylic acid, 4,5-imidazoledicarboxylic acid, 4-cyclohexene-1,2-dicarboxylic acid, hexatriacontanedicarboxylic acid, tetradecanedicarboxylic acid, 1,7-heptadicarboxylic acid, 5-hydroxy-1,3-benzenedicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluororubin-4,11-dicarboxylic acid, 7-chloro-3-methylquinoline-6,8-dicarboxylic acid, 2,4-dichlorobenzophenone-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid 1,14-tetradecanedicarboxylic acid, 5,6-dehydronorbornane-2,3-dicarboxylic acid, and 5-ethyl-2,3-pyridinedicarboxylic acid.

In certain embodiments, the invention relates to any one of the aforementioned MOF matrices, wherein the organic ligand is a tricarboxylic acid, including but not limited to 2-hydroxy-1,2,3-propanetricarboxylic acid, 7-chloro-2,3,8-quinolinetricarboxylic acid, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propanetricarboxylic acid, 4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid, and aurintricarboxylic acid.

In certain embodiments, the invention relates to any one of the aforementioned MOF matrices, wherein the organic ligand is a tetracarboxylic acid, including but not limited to 1,1-dioxidoperylo[1,12-BCD]thiophene-3,4,9,10-tetracarboxylic acid, perylenetetracarboxylic acids such as perylene-3,4,9,10-tetracarboxylic acid or perylene-1,12-sulfone-3,4,9,10-tetracarboxylic acid, butanetetracarboxylic acids, such as 1,2,3,4-butanetetracarboxylic acid or meso-1,2,3,4-butanetetracarboxylic acid, decane-2,4,6,8-tetracarboxylic acid, 1,4,7,10,13,16-hexaoxacyclooctadecane-2,3,11,12-tetracarboxylic acid, 1,2,4,5-benzenetetracarboxylic acid, 1,2,11,12-dodecanetetracarboxylic acid, 1,2,5,6-hexanetetracarboxylic acid, 1,2,7,8-octanetetracarboxylic acid, 1,4,5,8-naphthalenetetracarboxylic acid, 1,2,9,10-decanetetracarboxylic acid, benzophenonetetracarboxylic acid, 3,3',4,4'-benzophenonetetracarboxylic acid, tetrahydrofurantetracarboxylic acid, and cyclopentane-1,2,3,4-tetracarboxylic acid.

In certain embodiments, the invention relates to any one of the aforementioned MOF matrices, wherein the organic ligand is acetylenedicarboxylic acid (ADC), benzenedicarboxylic acids, naphthalenedicarboxylic acids, biphenyldicarboxylic acids (for example, 4,4'-biphenyldicarboxylic acid (BPDC)), bipyridinedicarboxylic acids (for example, 2,2'-bipyridinedicarboxylic acids like 2,2'-bipyridine-5,5'-dicarboxylic acid), benzenetricarboxylic acids (for example, 1,2,3-benzenetricarboxylic acid or 1,3,5-benzenetricarboxylic acid (BTC)), adamantanetetracarboxylic acid (ATC), adamantanedibenzoate (ADB), benzenetribenzoate (BTB), methanetetrabenzoate (MTB), adamantanetetrabenzoate, or dihydroxyterephthalic acids (for example, 2,5-dihydroxyterephthalic acid (DHBDC)).

In certain embodiments, the invention relates to any one of the aforementioned MOF matrices, wherein the organic ligand is terephthalic acid, isophthalic acid, 2-aminoterephthalic acid, 2,5-dihydroxyterephthalic acid, 1,2,3-benzenetricarboxylic acid, 1,3,5-benzenetricarboxylic acid, or 2,2'-bipyridine-5,5'-dicarboxylic acid.

In certain embodiments, the invention relates to any one of the aforementioned MOF matrices, wherein the organic ligand comprises a polydentate organic ligand and a monodentate organic ligand.

In certain embodiments, organic ligands are described in U.S. Pat. No. 5,648,508, hereby incorporated by reference in its entirety.

Exemplary Dopants

In certain embodiments, the invention relates to any one of the aforementioned MOF matrices, wherein the matrix further comprises a dopant, thereby forming a hybrid MOF matrix, or a MOF composite matrix. In certain embodiments, the dopant is a functional material. In certain embodiments, the dopant is of a shape and size sufficient to fit into the porous structure of MOF matrix. In certain embodiments, the dopant is acidic or basic. In certain embodiments, the dopant is a polyoxometalate (POM) or a nucleophilic amine.

In certain embodiments, the invention relates to any one of the aforementioned MOF matrices, wherein the MOF matrix comprises a polyoxometalate; and the polyoxometalate is a heteropoly acid or isopoly acid. In certain embodiments, the invention relates to any one of the aforementioned MOF matrices, wherein the MOF matrix comprises a polyoxometalate; and the polyoxometalate is phosphotungstic acid (PTA), phosphomolybdic acid, silicomolybdic acid, silicotungstic acid, phosphotungstomolybdic acid, phosphovanadomolybdic acid, or a heteropoly acid comprising tungsten or molybdenum and at least one other element having a positive valence from 2 to 7. In certain embodiments, the invention relates to any one of the aforementioned MOF matrices, wherein the MOF matrix comprises a polyoxometalate; and the polyoxometalate is phosphotungstic acid (PTA) or PTA modified by inclusion of metal ions. In certain embodiments, the invention relates to any one of the aforementioned MOF matrices, wherein the MOF matrix comprises a polyoxometalate; and the polyoxometalate is PTA modified by inclusion of Ti, Cr, Co, or Cu.

In certain embodiments, the invention relates to any one of the aforementioned MOF matrices, wherein the MOF matrix comprises a nucleophilic amine; and the nucleophilic amine is a 4-aminopyridine. In certain embodiments, the invention relates to any one of the aforementioned MOF matrices, wherein the nucleophilic amine is 4-N,N-dimethylaminopyridine (DMAP).

Exemplary Properties of Matrices of the Invention

In certain embodiments, the invention relates to any one of the aforementioned MOF matrices, wherein the MOF matrix is crystalline In certain embodiments, the invention relates to any one of the aforementioned MOF matrices, wherein the MOF matrix is one-, two-, or three-dimensional.

In certain embodiments, the invention relates to any one of the aforementioned MOF matrices, wherein the MOF matrix is porous. In certain embodiments, the invention relates to any one of the aforementioned MOF matrices, wherein the MOF matrix comprises a plurality of pores. In certain embodiments, the invention relates to any one of the aforementioned MOF matrices, wherein the MOF matrix comprises nanopores or mesopores. In certain embodiments, nanopores are defined as pores having a diameter from about 0.1 nm to about 2 nm. In certain embodiments, mesopores are defined as pores having a diameter in the range from about 2 nm to about 50 nm. In certain embodiments, the presence of nanoropores or mesopores can be studied using sorption measurements, these measurements determining the MOF uptake capacity for nitrogen as specified in DIN 66131 and/or DIN 66134.

In certain embodiments, the invention relates to any one of the aforementioned MOF matrices, wherein the MOF matrix comprises pores that range in diameter from about 0.1 nm to about 30 nm. In certain embodiments, the invention relates to any one of the aforementioned MOF matrices, wherein the MOF matrix comprises pores that range in diameter from about 0.1 nm to about 4 nm. In certain embodiments, the invention relates to any one of the aforementioned MOF matrices, wherein the MOF matrix comprises pores that have an average diameter of about 0.1 nm to about 30 nm. In certain embodiments, the invention relates to any one of the aforementioned MOF matrices, wherein the MOF matrix comprises pores that have an average diameter of about 0.1 nm to about 4 nm. In certain embodiments, the invention relates to any one of the aforementioned MOF matrices, wherein the MOF matrix comprises pores that have an average diameter of about 0.1 nm, about 0.2 nm, about 0.3 nm, about 0.4 nm, about 0.5 nm, about 0.6 nm, about 0.7 nm, about 0.8 nm, about 0.9 nm, about 1.0 nm, about 1.5 nm, about 2.0 nm, about 2.5 nm, about 3.0 nm, about 3.5 nm, about 4 nm, about 4.5 nm, about 5.0 nm, about 6 nm, about 7 nm, about 8 nm, about 9 nm, about 10 nm, about 12 nm, about 14 nm, about 16 nm, about 18 nm, about 20 nm, about 22 nm, about 24 nm, about 26 nm, about 28 nm, or about 30 nm.

In certain embodiments, the invention relates to any one of the aforementioned MOF matrices, wherein the specific surface area of the MOF matrix, calculated according to the Langmuir model (DIN 66131, 66134) for a MOF in powder form, is greater than about 5 $m^2/g$, greater than about 10 $m^2/g$, greater than about 50 $m^2/g$, greater than about 500 $m^2/g$, greater than about 1000 $m^2/g$, or greater than about 1500 $m^2/g$. In certain embodiments, the invention relates to any one of the aforementioned MOF matrices, wherein the specific surface area of the MOF matrix, calculated according to the Langmuir model (DIN 66131, 66134) for a MOF in powder form, is less than about 10,000 $m^2/g$.

In certain embodiments, the invention relates to any one of the aforementioned MOF matrices, wherein the MOF matrix catalyzes aldehyde-alcohol reactions at ambient temperature.

In certain embodiments, the invention relates to any one of the aforementioned MOF matrices, wherein the MOF matrix catalyzes the Baeyer condensation of aldehydes and phenols.

In certain embodiments, the invention relates to any one of the aforementioned MOF matrices, wherein the MOF matrix catalyzes aldehyde or ketone acetalizations.

In certain embodiments, the invention relates to any one of the aforementioned MOF matrices, wherein the MOF matrix catalyzes aldehyde self-condensation.

In certain embodiments, the invention relates to any one of the aforementioned MOF matrices, wherein the MOF matrix captures and catalyzes reactions of acetaldehyde, acrolein, formaldehyde, butyraldehyde, crotonaldehyde, benzyl aldehyde, propionaldehyde, phenol, m-cresol, p-cresol, o-cresol, α-naphthol, or β-naphthol.

In certain embodiments, the invention relates to any one of the aforementioned MOF matrices, wherein the MOF matrix chemically or physically adsorbs, absorbs, entraps, catalyzes, or chemically reacts with a product of tobacco combustion or pyrolysis. In certain embodiments, the invention relates to any one of the aforementioned MOF matrices, wherein the MOF matrix adsorbs, absorbs, or converts at least one product of tobacco combustion or pyrolysis.

In certain embodiments, the invention relates to any one of the aforementioned MOF matrices, wherein the MOF matrix catalyzes condensation reactions such as polycondensation reactions of aldehydes that lead to (i) increasing the product molecular weight making is less volatile relative to the initial aldehyde, and (ii) consumption of toxic aldehyde groups. In certain embodiments, the invention relates to any one of the aforementioned MOF matrices, wherein the MOF matrix catalyzes condensation reactions between aldehydes and phenols (Baeyer reactions), leading to the consumption of both aldehyde and phenol toxicant families.

Exemplary Filter Elements of the Invention

In certain embodiments, the invention relates to a filter element comprising any one of the aforementioned MOF matrices.

In certain embodiments, the invention relates to any one of the aforementioned filter elements, wherein the filter element has a filter rod structure. In certain embodiments, the filter rod structure means a structure (a filter structure) formed by arranging a given number of mono-filaments (for example, about 3,000 to about 100,000 mono-filaments) in the flow direction of mainstream smoke.

In certain embodiments, the invention relates to any one of the aforementioned filter elements, wherein the filter element is capable of reducing the quantity of contaminants in smoke.

In certain embodiments, the invention relates to any one of the aforementioned filter elements, wherein the filter element comprises a fiber. In certain embodiments, the invention relates to any one of the aforementioned filter elements, wherein the fiber comprises cellulose acetate. In certain embodiments, the invention relates to any one of the aforementioned filter elements, wherein the cellulose acetate comprises a plurality of isocyanate moieties.

In certain embodiments, the invention relates to any one of the aforementioned filter elements, wherein the filter element comprises the MOF matrix in an amount from about 0.5% to about 20% by weight. In certain embodiments, the invention relates to any one of the aforementioned filter elements, wherein the filter element comprises the MOF matrix in about 0.5%, about 1.0%, about 1.5%, about 2.0%, about 2.5%, about 3.0%, about 3.5%, about 4.0%, about 4.5%, about 5.0%, about 5.5%, about 6.0%, about 6.5%, about 7.0%, about 7.5%, about 8.0%, about 8.5%, about 9.0%, about 9.5%, about 10%, about 11%, about 12%, about 13%, about 14%, about 15%, about 16%, about 17%, about 18%, about 19%, or about 20% by weight.

Exemplary Smoking Articles of the Invention

In certain embodiments, the invention relates to a smoking article comprising any one of the aforementioned filter elements. In certain embodiments, the invention relates to any one of the aforementioned smoking articles, wherein the smoking article comprises any one of the aforementioned filter elements attached to a tobacco rod.

In certain embodiments, the invention relates to any one of the aforementioned smoking articles, wherein the smoking article is a cigarette, a cigar, or a pipe.

Popular smoking articles, such as cigarettes, have a substantially cylindrical rod-shaped structure and include a charge, roll or column of smokable material such as shredded tobacco (e.g., in cut filler form) surrounded by a paper wrapper thereby forming a so-called "smokable rod" or "tobacco rod." Normally, a cigarette has a cylindrical filter element aligned in an end-to-end relationship with the tobacco rod. Typically, a filter element comprises cellulose acetate tow plasticized using triacetin, and the tow is circumscribed by a paper material known as "plug wrap." A cigarette can incorporate a filter element having multiple segments, and one of those segments can comprise activated charcoal particles. Typically, the filter element is attached to one end of the tobacco rod using a circumscribing wrapping material known as "tipping paper." It also has become desirable to perforate the tipping material and plug wrap, in order to provide dilution of drawn mainstream smoke with ambient air. A cigarette is employed by a smoker by lighting one end thereof and burning the tobacco rod. The smoker then receives mainstream smoke into his or her mouth by drawing on the opposite end (e.g., the filter end) of the cigarette.

In certain embodiments, the invention relates to any one of the aforementioned smoking articles, wherein the filter element is inserted into the smoking article.

Exemplary Methods of the Invention

In certain embodiments, the invention relates to a method of capturing carbonylic compounds or converting carbonylic compounds into less volatile compounds. In certain embodiments, the capturing occurs via physical or chemical adsorption, absorption, or entrapping toxicant components of the cigarette smoke and smoke constituents.

In certain embodiments, the invention relates to a method of adsorbing or absorbing a carbonylic compound or a phenolic compound, comprising contacting the carbonylic compound or phenolic compound with any one of the aforementioned MOF matrices.

In certain embodiments, the invention relates to a method of catalyzing the conversion of a carbonylic compound to a non-carbonylic product, comprising contacting the carbonylic compound with any one of the aforementioned MOF matrices for an amount of time, thereby forming the non-carbonylic product.

In certain embodiments, the invention relates to any one of the aforementioned methods, wherein the non-carbonylic product is a ketal, an acetal, a polyketal, a polyacetal, or an organic heterocycle.

In certain embodiments, the invention relates to a method of catalyzing the conversion of a phenolic compound to a non-phenolic product or a polymeric product, comprising contacting the phenolic compound with any one of the aforementioned MOF matrices for an amount of time, thereby forming the non-phenolic product or the polymeric product.

In certain embodiments, the invention relates to any one of the aforementioned methods, wherein the non-phenolic product is an organic heterocycle.

In certain embodiments, the invention relates to a method of catalyzing an alcohol-aldehyde condensation, comprising contacting an alcohol and an aldehyde with any one of the aforementioned MOF matrices for an amount of time. In certain embodiments, the invention relates to any one of the aforementioned methods, wherein the alcohol is phenol. In certain embodiments, the invention relates to any one of the aforementioned methods, wherein the alcohol is phenol from cigarette smoke. In certain embodiments, the invention relates to any one of the aforementioned methods, wherein the alcohol is naphthol. In certain embodiments, the invention relates to any one of the aforementioned methods, wherein the aldehyde is formaldehyde. In certain embodiments, the invention relates to any one of the aforementioned methods, wherein the aldehyde is acetaldehyde. In certain embodiments, the invention relates to any one of the aforementioned methods, wherein the aldehyde is benzaldehyde. In certain embodiments, the invention relates to any one of the aforementioned methods, wherein the alcohol or the aldehyde is adsorbed onto the MOF matrix.

In certain embodiments, the invention relates to a method of acetylizing an aldehyde with an alcohol, comprising contacting the aldehyde and the alcohol with any one of the aforementioned MOF matrices.

In certain embodiments, the invention relates to any one of the aforementioned methods, wherein the aldehyde is benzaldehyde.

In certain embodiments, the invention relates to any one of the aforementioned methods, wherein the alcohol is methanol.

In certain embodiments, the invention relates to any one of the aforementioned methods, wherein the carbonylic compound or phenolic compound is a product of tobacco combustion or pyrolysis.

In certain embodiments, the invention relates to a method of substantially reducing the quantity of a toxicant in a fluid, comprising contacting the fluid with any one of the aforementioned MOF matrices.

In certain embodiments, the invention relates to a method of substantially removing a toxicant from a fluid, comprising contacting the fluid with any one of the aforementioned MOF matrices.

In certain embodiments, the invention relates to any one of the aforementioned methods, wherein the fluid is a gas. In certain embodiments, the invention relates to any one of the aforementioned methods, wherein the fluid is an aerosol. In certain embodiments, the invention relates to any one of the aforementioned methods, wherein the fluid is tobacco smoke. In certain embodiments, the invention relates to any one of the aforementioned methods, wherein the fluid is cigarette smoke. In certain embodiments, the invention relates to any one of the aforementioned methods, wherein the fluid is mainstream cigarette smoke or sidestream cigarette smoke. Smoking articles, such as cigarettes or cigars, produce both mainstream smoke during a puff, and sidestream smoke during static burning.

In certain embodiments, the invention relates to any one of the aforementioned methods, wherein the toxicant is a carbonylic compound or a phenolic compound.

In certain embodiments, the invention relates to any one of the aforementioned methods, wherein the carbonylic compound comprises acetaldehyde, acrolein, formaldehyde, butyraldehyde, crotonaldehyde, benzyl aldehyde, or propionaldehyde.

In certain embodiments, the invention relates to any one of the aforementioned methods, wherein the phenolic compound comprises phenol, m-cresol, p-cresol, o-cresol, α-naphthol, or β-naphthol.

In certain embodiments, the invention relates to any one of the aforementioned methods, wherein the quantity of toxicant in the fluid is reduced.

In certain embodiments, the invention relates to any one of the aforementioned methods, wherein the toxicant is adsorbed onto or absorbed into the MOF matrix. In certain embodiments, the invention relates to any one of the aforementioned methods, wherein the toxicant is chemically converted into a less volatile substance. In certain embodiments, the less volatile substance is a ketal, an acetal, a polyketal, a polyacetal, a polymer, or an organic heterocycle.

In certain embodiments, the invention relates to a method of making any one of the aforementioned MOF matrices. In certain embodiments, the MOF matrices may be made in a solvent selected from the group consisting of ethanol, dimethylformamide, toluene, methanol, chlorobenzene, diethylformamide, dimethyl sulfoxide, water, hydrogen peroxide, methylamine, sodium hydroxide solution, N-methylpolidone ether, acetonitrile, benzyl chloride, triethylamine, ethylene glycol, and mixtures thereof. In certain embodiments, solvents for making any one of the aforementioned MOF matrices are described in U.S. Pat. No. 5,648,508, hereby incorporated by reference in its entirety.

In certain embodiments, the invention relates to a method of making any one of the aforementioned MOF matrices. In certain embodiments, the invention relates to any one of the aforementioned methods, comprising contacting an aqueous PTA solution with MIL-101. In certain embodiments, the invention relates to any one of the aforementioned methods, comprising autoclaving aqueous Cr(III) nitrate and terephthalic acid solutions. In certain embodiments, the invention relates to any one of the aforementioned methods, comprising autoclaving $Cr(NO_3)_3$, terephthalic acid, and PTA in water. In certain embodiments, the invention relates to any one of the aforementioned methods, further comprising the step of evaporating the solvent.

In certain embodiments, the invention relates to any one of the aforementioned methods, wherein the pore size of the resulting MOF matrix may be controlled. In certain embodiments, the invention relates to any one of the aforementioned methods, the pore size of the MOF matrix is controlled by selection of the organic ligand. While not wishing to be bound by any particular theory, in certain embodiments, the larger the organic ligand, the larger the pore diameter in the resulting MOF matrix.

In certain embodiments, the invention relates to a method of making any one of the aforementioned filter elements. In certain embodiments, the method comprises the step of: contacting a particle comprising any one of the aforementioned MOF matrices with a fiber of a filter element, thereby forming a coated fiber. In certain embodiments, the invention relates to any one of the aforementioned methods, wherein a pendant group on the organic ligand reacts with a functional group on the fiber, thereby producing a reaction product. In certain embodiments, the pendant group on the organic ligand is an amino group. In certain embodiments, the functional group on the fiber is an isocyanate moiety. In certain embodiments, the reaction product is a urea.

In certain embodiments, the invention relates to any one of the aforementioned methods, further comprising the step of: dissolving a plurality of particles comprising any one of the aforementioned MOF matrices in a second solvent, thereby forming a MOF matrix solution. In certain embodiments, the second solvent is tetrahydrofuran or acetone. In certain embodiments, the solution further comprises an additive. In certain embodiments, the additive is toluene diisocyanate. In certain embodiments, the concentration of additive in the second solvent is from about 0.5% by weight to about 10% by weight. In certain embodiments, the concentration of additive in the second solvent is about 0.5%, about 1.0%, about 1.5%, about 2.0%, about 2.5%, about 3.0%, about 3.5%, about 4.0%, about 4.5%, about 5.0%, about 5.5%, about 6.0%, about 6.5%, about 7.0%, about 7.5%, about 8.0%, about 8.5%, about 9.0%, about 9.5%, or about 10% by weight.

In certain embodiments, the invention relates to any one of the aforementioned methods, wherein the concentration of MOF matrix in the second solvent is from about 0.5% to about 20% by weight. In certain embodiments, the invention relates to any one of the aforementioned methods, wherein the concentration of MOF matrix in the second solvent is about 0.5%, about 1.0%, about 1.5%, about 2.0%, about 2.5%, about 3.0%, about 3.5%, about 4.0%, about 4.5%, about 5.0%, about 5.5%, about 6.0%, about 6.5%, about 7.0%, about 7.5%, about 8.0%, about 8.5%, about 9.0%, about 9.5%, about 10%, about 11%, about 12%, about 13%, about 14%, about 15%, about 16%, about 17%, about 18%, about 19%, or about 20% by weight.

In certain embodiments, the invention relates to any one of the aforementioned methods, wherein the MOF matrix solution is sprayed onto the fiber.

In certain embodiments, the invention relates to any one of the aforementioned methods, wherein the spraying is conducted in a continuous stream of air, thereby substantially evaporating the second solvent substantially simultaneously.

In certain embodiments, the invention relates to any one of the aforementioned methods, further comprising the step of: maintaining the coated fibers at a temperature for a second period of time.

In certain embodiments, the invention relates to any one of the aforementioned methods, wherein the temperature is from about 40° C. to about 100° C. In certain embodiments, the temperature is about 40° C., about 45° C., about 50° C., about 55° C., about 60° C., about 65° C., about 70° C., about 75° C., about 80° C., about 85° C., about 90° C., about 95° C., or about 100° C.

In certain embodiments, the invention relates to any one of the aforementioned methods, wherein the second period of time is from about 30 min to about 90 min. In certain embodiments, the invention relates to any one of the aforementioned methods, wherein the second period of time is about 30 min, about 40 min, about 50 min, about 60 min, about 70 min, about 80 min, or about 90 min.

EXEMPLIFICATION

The invention now being generally described, it will be more readily understood by reference to the following, which is included merely for purposes of illustration of certain aspects and embodiments of the present invention, and is not intended to limit the invention.

Example 1

Synthesis of Porous Catalytic Matrices

Materials

Chromium (III) nitrate nonahydrate (99%), terephthalic acid (≥99%), aluminum chloride hexahydrate ($AlCl_3 \cdot 6H_2O$, 99%), acetaldehyde (≥99.5%), 2-amino terephthalic acid (99%), N,N-dimethylformamide (>99.9%), 2-naphthol (99%), benzaldehyde (purified by redistillation, ≥99.5%), β-caryophyllene (≥98.5%, sum of enantiomers, GC), methanol (anhydrous, 99.8%), phenol (≥99%) and acetamide (≥99.0%) were all obtained from Sigma-Aldrich Chemical Co. and were used as received. Hydrated 12-tungstophosphoric acid ($H_3PW_{12}O_{40}$, PTA) (Sigma-Alrich, >99%) was dried at 70° C. for 8 h to obtain $H_3PW_{12}O_{40} \cdot 6H_2O$. All other chemicals and solvents used were obtained from commercial sources and were of highest purity available.

Porous MIL-101 (Cr) Matrix Synthesis

Particles of metal-organic framework (MOF) MIL-101 were synthesized hydrothermally, utilizing either microwave (MW) or autoclave oven heat supply. In the autoclave method, $Cr(NO_3)_3 \cdot 9H_2O$ (2.0 g, 5 mmol), terephthalic acid (0.83 g, 5 mmol) and deionized water (20 mL) were blended and briefly sonicated resulting in a dark blue-colored suspension with a pH of 2.58. The suspension was placed in a Teflon®-lined autoclave bomb and kept in an oven at 218° C. for 18 h without stirring. After the synthesis and equilibration at room temperature, pH 0.5 was recorded in the suspension.

In the MW synthesis, $Cr(NO_3)_3 \cdot 9H_2O$ (1 mmol, 400 mg), terephthalic acid (166 mg, 1 mmol) and deionized water (4500 mg, 250 mmol) were blended and briefly sonicated, resulting in a suspension with the initial pH 2.60. In a separate series of experiments, the pH was adjusted as needed using 1 M aqueous NaOH. A sample (1 mL) was withdrawn from the suspension, placed it in a glass tube and microwaved using CEM Discover MW oven (CEM Corp., Matthews, N.C.) at 220° C. for 15 min using 300 mW power under constant stirring.

After either synthesis, the MOF solids were separated from water using centrifuge (5,000 g, 10 min) and washed with water, methanol and acetone. The suspension in acetone was centrifuged and separated, the solids were placed in N,N-dimethylformamide (20 mL) and the suspension was sonicated for 10 min and then kept at 70° C. overnight. The resulting solids were separated by centrifugation, repeatedly washed with methanol and acetone, dried at 75° C. overnight and then under vacuum ($10^{-5}$ Torr) at ambient temperature for 2 days. Total yield of dry MIL-101 particles based on chromium was 54-63 wt %. Typical elemental analysis, wt %: C, 48.1; Cr, 10.3.

Synthesis of MIL-101 (Cr)-phosphotungstic Acid (PTA) Hybrid Materials (MIL101/PTA)

The hybrid materials were synthesized by either autoclaving chromium nitrate, terephthlaic acid and phosphotungstic acid mixtures in water or by impregnating already prepared MIL-101 by aqueous solution of phosphotungstic acid in water. In a typical "joint autoclaving" synthesis (resulting MOF designated MIL101/PTA$_{ja}$), $Cr(NO_3)_3 \cdot 9H_2O$ (2.0 g, 5 mmol), terephthalic acid (0.83 g, 5 mmol), phosphotungstic acid (2 g, 0.7 mmol), and deionized water (20 mL) were blended and briefly sonicated resulting in a dark blue-colored suspension with a pH of 2.58. The suspension was placed in a Teflon®-lined autoclave bomb and kept in an oven at 218° C. for 18 h without stirring. The resulting MIL101/PTA$_{aj}$ solids were separated by centrifugation and washed with water, methanol, acetone and then dried under vacuum until constant weight. Elemental analysis (wt %): C, 33.1; Cr, 7.58; W, 21.8.

In the "impregnation" method, 1 g of dry MIL-101 synthesized in autoclave as described above was suspended in aqueous solution of phosphotungstic acid (1.0 g in 20 mL). The suspension was sonicated and shaken at 300 rpm at ambient temperature for 2 days. The solids were separated by centrifugation and dried under vacuum. The resulting MOF was designated MIL101/PTA$_{imp}$. Elemental analysis (wt %): C, 33.5; Cr, 9.23; W, 19.9.

Based on the elemental analysis and molecular weight of the Keggin structure ($H_3PW_{12}O_{40}$, 2880 Da), we estimated the PTA content of the MIL101/PTA$_{aj}$ and MIL101/PTA$_{imp}$ materials to be approximately 31 wt %.

Example 2

Synthesis and Properties of $NH_2$-MIL-101 (al) Porous Material and $NH_2$-MIL-101 (Al) Doped with Dimethlaminopyridine (DMAP)

A solution of aluminum chloride hexahydrate (0.97 g, 4.0 mmol) and 2-aminoterephthalic acid (1.09 g, 6.0 mmol) in 30 mL of DMF was placed in a Teflon®-lined autoclave and kept there at 130° C. for 72 h. The resulting yellow powder was separated by centrifugation (10,000 g, 15 min), washed with acetone, separated and suspended in 200 mL methanol at 75° C. for 24 h. The resulting powder was recovered from methanol by centrifugation and dried under vacuum. MOF surface area and pore parameters were measured using a Micromeritics' ASAP® 2020 Accelerated Surface Area and Porosimetry Analyzer (Micromeritics Corp., Norcross, Ga.). The compound's BET and Langmuir surface area values were measured to be 2080 and 2880 $m^2/g$, respectively, and the average pore diameter was 2.2 nm.

For doping by DMAP, a solution of DMAP (1 g) in 30 mL methanol was added to 1 g of $NH_2$-MIL-101 (Al) and the suspension was briefly sonicated and then shaken at room temperature for 48 h. The solid particles were then separated by centrifugation (10,000 g, 15 min), washed by methanol and dried under vacuum at room temperature.

Example 3

Synthesis and Properties of MIL-89 Porous Material and MIL-89 Doped With Dimethyaminopyridine (DMAP)

First, $\mu_3$-oxo-triaquohexakis(acetato)triiron(III)perchlorate dihydrate was prepared as follows: Electrolytic iron metal powder (11.2 g, 0.2 mol) was stirred with 100 mL of water and 51.6 mL (0.6 mol) of 70% $HClO_4$. The mixture was warmed to 50° C. until all of the iron had reacted. A small amount of insoluble matter was removed by centrifugation. After the solution was cooled to 10° C., an excess (30 mL) of a 15% $H_2O_2$ solution was added. The solution was cooled to 5° C., and anhydrous sodium acetate (32.8 g, 0.4 mol) was slowly added with stirring. The reaction mixture was placed in a stream of air. After 5 days the majority of the solution evaporated, leaving large red-brown crystals; yield 7.99 g (30.0%). The crystals were collected, washed with two 25-mL portions of chilled water, and blotted with filter paper. The crystals were further dried for 24 h under vacuum at room temperature.

Secondly, MOF Fe(III) acetate-muconic acid 1:5 (MIL-89) was synthesized as follows: Oxo-triaquohexakis(acetato)triiron(III) (400 mg) was dissolved in absolute ethanol (20 mL) and some amount remained undissolved, which was removed by centrifugation, dried and weighed. The dissolved fraction weighed 341 mg (0.277 mmol). To that solution, 200 mg (1.4 mmol) of trans,trans-muconic acid was added. The mixture was kept in a sealed vial at 75° C. for 1 week, resulting in orange particulates. The MOF was purified by DMF, hot methanol (3 times) and dried at 75° C. for 24 h and then under vacuum ($10^{-5}$ Torr) for 1 week.

MOF surface area and pore parameters were measured using a Micromeritics' ASAP® 2020 Accelerated Surface Area and Porosimetry Analyzer (Micromeritics Corp., Norcross, Ga.). The compound's BET and Langmuir surface area values were measured to be 1880 and 2650 $m^2/g$, respectively.

For doping by DMAP, a solution of DMAP (1 g) in 30 mL methanol was added to 1 g of MIL-89 and the suspension was briefly sonicated and then shaken at room temperature for 48 h. The solid particles were then separated by centrifugation (10,000 g, 15 min), washed by methanol and dried under vacuum at room temperature.

Example 4

Properties of Porous Matrices Based on MIL-101 (Cr)

MOF surface area and pore parameters were measured using a Micromeritics' ASAP® 2020 Accelerated Surface Area and Porosimetry Analyzer (Micromeritics Corp., Norcross, Ga.). Thermogravimetric Analysis (TGA) was conducted using a Q5000IR thermogravimetric analyzer (TA Instruments, Inc.). Samples were subjected to heating scans (20° C./min) in nitrogen atmosphere and in a temperature ramp mode. $^1H$, $^{31}P$ and $^{13}C$ NMR spectra were collected at 25±0.5° C. using a Bruker Avance-400 spectrometer operating at 400.01, 161.9 and 100 MHz, respectively. Particle size distribution in MOF suspensions in methanol was measured using a ZetaPALS instrument (Brookhaven Instruments Corp.). The melting points were determined with a MeI-Temp II apparatus (Laboratory Devices USA) and are uncorrected. Elemental analysis was conducted in a commercial laboratory using an ICP apparatus.

Figure 1:
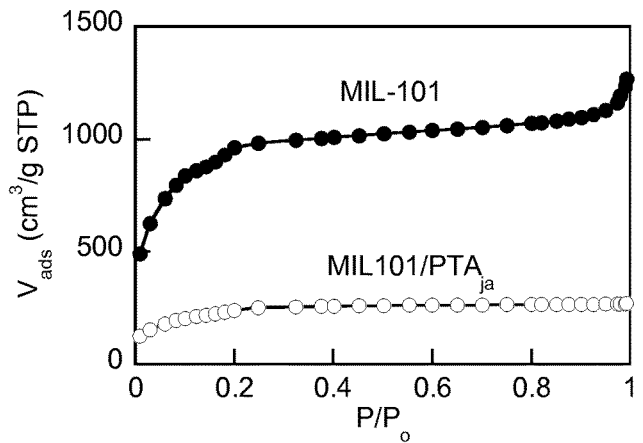
FIG. 1 depicts typical BET nitrogen adsorption isotherms for MIL-101 and MIL101/PTA hybrid material at 77 K. $P/P_0$ is the ratio of gas pressure (P) to saturation pressure ($P_0$), with $P_0$=746 torr.
Figures 6, 7, 8:
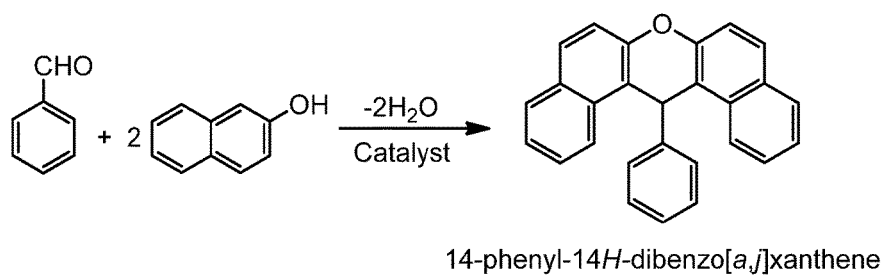
FIG. 6 depicts a schematic showing a reaction between benzaldehyde and 2-naphthol catalyzed by a porous matrix of the present invention.
FIG. 7 tabulates properties of MIL-101 (Cr) particles synthesized in deionized water at pH 2.6. [a] Yield is calculated using chromium content in purified particles vs initial chromium content set in the synthesis. [b] Measured in particle suspension in methanol. [c] Determined from nitrogen adsorption isotherms. [d] Computed using instrument's built-in software using Barrett, Joyner & Halenda method.
FIG. 8 tabulates properties of MIL101/PTA hybrid materials synthesized by joint autoclaving of the MIL-101 components and PTA in deionized water (MIL101/PTAja) or by impregnation of MIL-101 by PTA in water. [a] Determined from nitrogen adsorption isotherms. [b] Obtained from elemental analysis and calculations based on Keggin structure ($H_3PW_{12}O_{40}$)

The properties of the MIL-101 (Cr) particles synthesized in deionized water at pH 2.6 are collected in FIG. 7, whereas the properties of the MIL101/PTA matrices are shown in FIG. 1 and FIG. 8.

Example 5

Capture and Conversion of Acrolein

Acrolein (also known as 2-propenal) is the persistent toxicant found in cigarette smoke. Acrolein can cause DNA damage that is similar to the damage seen in lung cancer patients. Since smoke contains up to 1,000 times more acrolein than other DNA-damaging chemicals, it could be a major cause of lung cancer. Acrolein also stops human cells from repairing DNA damage. And, like hydrogen cyanide, it kills the hairs that normally clean our lungs of other toxins. Its reactivity is due to the presence of its two reactive functions, vinyl and aldehyde, which can react individually or together. Acrolein is volatile, with boiling point at 53° C. and vapor pressure of 286 mbar at 20° C. In this example, we observed that acrolein is captured by and readily polymerized in the presence of basic and acidic MOF to give insoluble polymers (polyacroleins).

For acrolein capture, glass vials, each containing a weighed amount of dry powder of MIL-101, MIL101/$PTA_{ja}$, MIL101/$PTA_{imp}$, PTA, $NH_2$-MIL-101 (Al), $NH_2$-MIL-101 (Al) doped with DMAP, and MIL-89 and MIL-89 doped with DMAP were placed in a desiccator next to an open Petri dish containing 10 g of liquid acrolein. The open vials were kept in the sealed desiccator for 5 days at room temperature, while weighing the uptake periodically by withdrawing the vials, rapidly sealing them and measuring weight. Equilibrium weight uptake was reached after 3 days, at which point no further weight increase of the vials was observed. The samples were prepared and measured in triplicate. The weight uptake was calculated as WU, %=100×(Sample weight after equilibration-Initial sample weight)/Initial sample weight.

Figure 2:
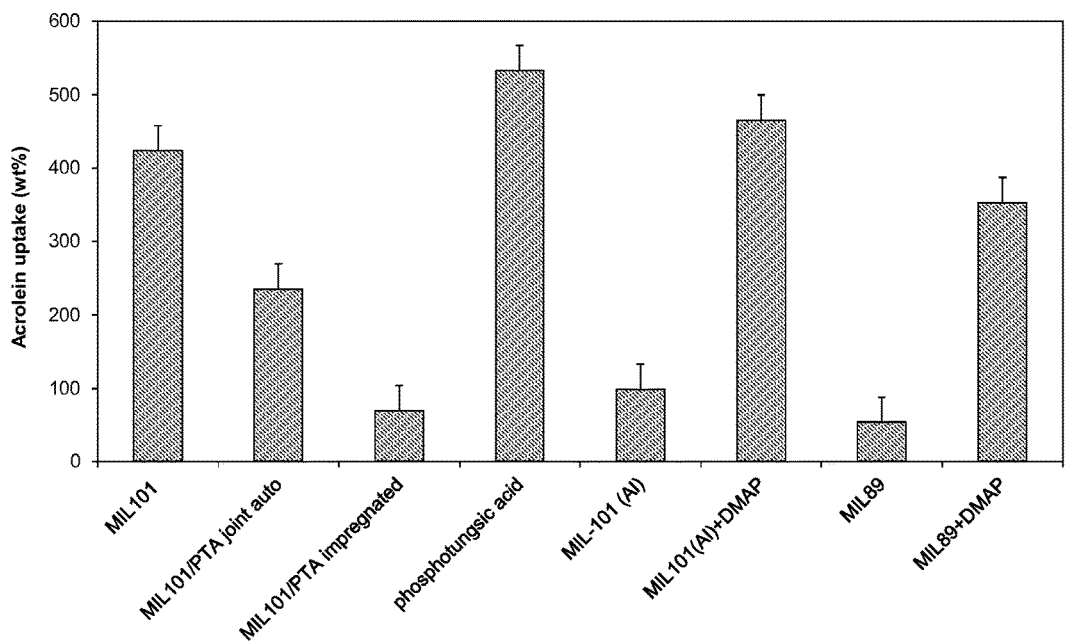
FIG. 2 depicts equilibrium acrolein uptake by exemplary porous matrices and exemplary compounds of the present invention at room temperature.
Figure 3:
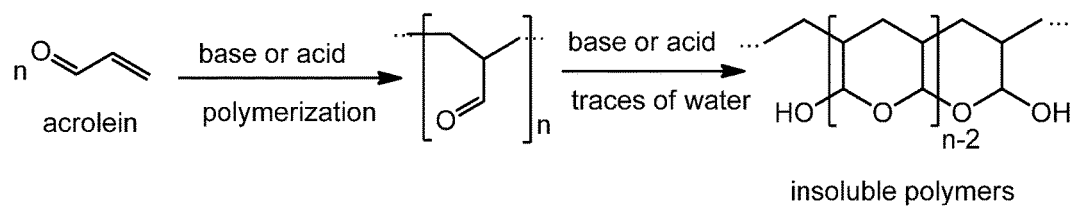
FIG. 3 depicts a schematic of acrolein polymerization in the presence of the strong bases or acids of exemplary matrices of the present invention.

The results of the weight uptake of acrolein are given in FIG. 2. As is seen, over 420 wt % acrolein uptake was observed by MIL-101 (Cr), which is the matrix with the highest pore volume and surface area. The uptake was significantly reduced by doping the MIL-101 (Cr) matrix with phosphotungstic acid (PTA), despite of the fact that PTA itself caused rapid polymerization of the vapors (see uptake of PTA exceeding 530%). The formation of transparent or yellowish polymeric layers was observed in all of the samples, but was most prevalent in the case of PTA. Phosphotungstic acid is the most potent acid of the known heteropolyacids, which causes polymerization of acrolein. It may be hypothesized that rapid polymerization of acrolein around PTA embedded into the pores of the MIL-101 prevented further uptake of the acrolein vapors in the cases of MIL-101(Cr)/PTA matrices, which reduced the overall acrolein uptake. Matrices MIL-101 (Al) and MIL-89 possessed much lesser surface area than MIL-101(Cr) and thus captured lesser amounts of acrolein. The ability of these matrices to uptake acrolein dramatically, 4.5-6.5-fold, increased by their modification with DMAP, which is an efficient catalyst of acrolein polymerization. In certain embodiments, the matrices of the present invention are capable of capturing acrolein vapors up to 5-fold of the matrix weight. The captured acrolein is rapidly converted into non-volatile polymeric species. Without being bound by any theory, polymerization of acrolein by an exemplary catalytic matrix of the present invention is shown in FIG. 3.

Example 6

Capture and Conversion of Acetaldehyde

Acetaldehyde ($CH_3CHO$) is a saturated aldehyde with a pungent and suffocating odor, but at more dilute concentrations the odor is fruity and pleasant, despite being irritant and lacrymator. Acetaldehyde is extremely volatile, with a boiling point of 20.16° C. and vapor pressure at 20° C. of 0.97 atm. Acetaldehyde concentration in cigarettes is 0.5-1.2 mg/cigarette and 98% of the compound is found in the vapor phase/smoke. We conducted experiments illustrating the capture of acetaldehyde from vapor phase and its catalytic conversion into less volatile products as follows.

For acetaldehyde capture, borosilicate glass vials, each containing a weighed amount of dry powder of MIL-101, MIL101/$PTA_{ja}$, MIL101/$PTA_{imp}$, or PTA were placed in a desiccator next to an open Petri dish containing 10 g of liquid acetaldehyde, initially poured into the dish at −20° C. Acetaldehyde rapidly evaporated from the Petri dish at room temperature, with the vapors contained inside of the sealed desiccator. The open vials were kept in the sealed desiccator for 7 days at room temperature, while weighing the uptake periodically by withdrawing the vials from the desiccator, immediately sealing them and measuring weight. Liquid acetaldehyde was added into the Petri dish within the desiccator each time the desiccator was open for samples withdrawal, to maintain the saturated vapor atmosphere inside the dessiccator. Equilibrium weight uptake was reached after 2 days, at which point no further weight increase of the vials was observed. Small samples (0.1 mL) of liquid formed in the vials were withdrawn intermittently after 2 days. Rapid change of color from white to yellow to brown to black was observed in the liquid condensed in the vials. The samples were prepared and measured in triplicate. The weight uptake was calculated as WU, %=100×(Sample weight after equilibration−Initial sample weight)/Initial sample weight.

Figure 4:
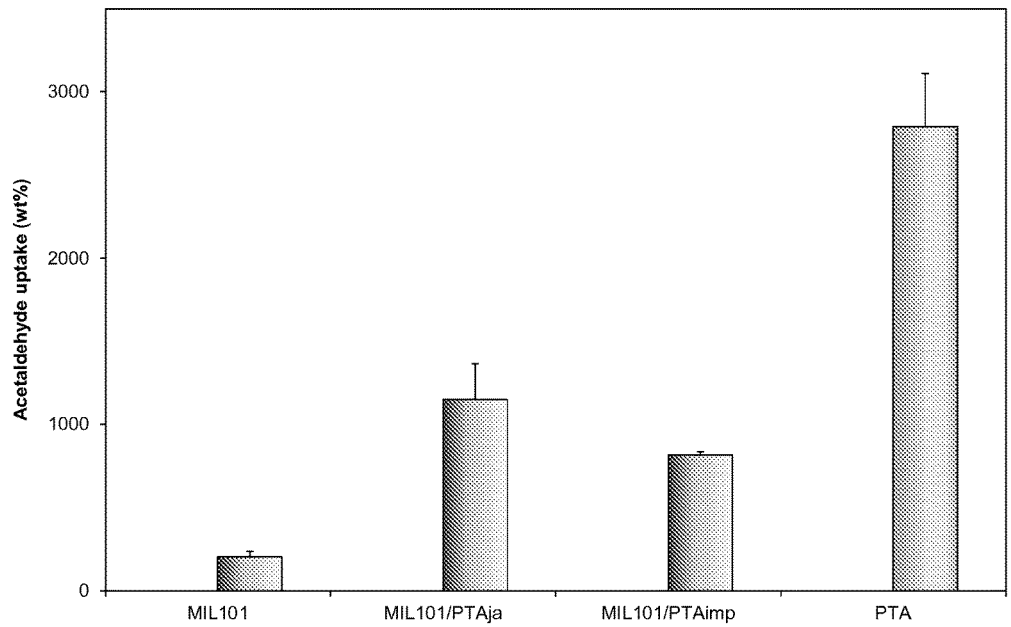
FIG. 4 depicts equilibrium acetaldehyde uptake by exemplary porous matrices of the present invention and phosphotungstic acid (PTA) at room temperature.

The results of the weight uptake of acetaldehyde are given in FIG. 4. As is seen, over 200 wt % acetaldehyde uptake was observed by porous MIL-101 (Cr) matrix. The uptake was dramatically, over 4- to 5-fold, enhanced by doping the MIL-101 (Cr) matrix with phosphotungstic acid (PTA), resulting in MIL101/PTAja and MIL101/PTAimp matrices being filled with black liquid. The solid PTA powder completely dissolved in the black condensate liquid formed around it, with the uptake exceeding 2780%. It appeared that we unexpectedly discovered that PTA and PTA-loaded matrices are powerful condensing agents for acetaldehyde. The liquid condensed over the (initially) solid samples of the study was analyzed for composition by Matrix Assisted Laser Desorption/Ionization Time of Flight (MALDI-TOF) mass spectrometry using an Applied Biosystems Model Voyager DE-STR instrument, with α-cyano-4-hydroxycinnamic acid (ACHCA) as a matrix. A typical MALDI-TOF spectrum overlapped with the ACHCA spectrum is shown in FIG. 5.

Figure 5:
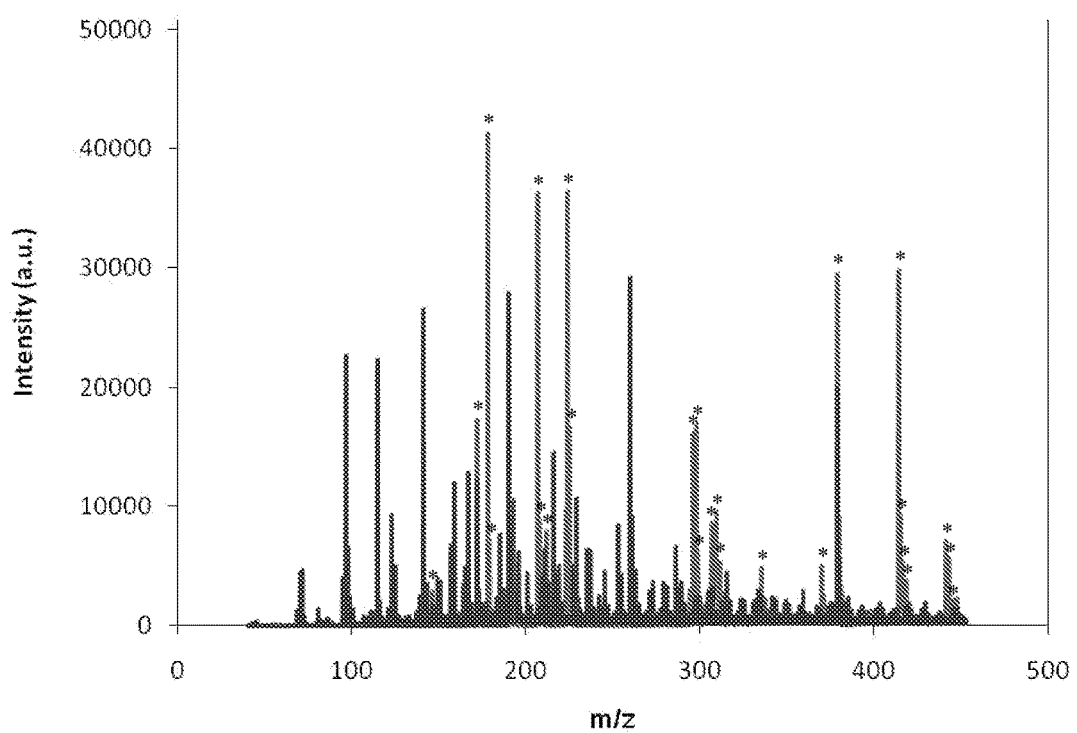
FIG. 5 depicts typical MALDI-TOF spectrum of the liquid condensed over MIL101/PTA$_{ja}$ matrix after 2 days of exposure to acetaldehyde vapors at room temperature (peaks have no indicator). Also shown is a spectrum of α-cyano-4-hydroxycinnamic acid (ACHCA) matrix (indicated by *). For the measurement, 1 μL of the liquid was lyophilized, reconstituted in 1 μL of ACHCA matrix solution, spotted and analyzed.
Figure 11:
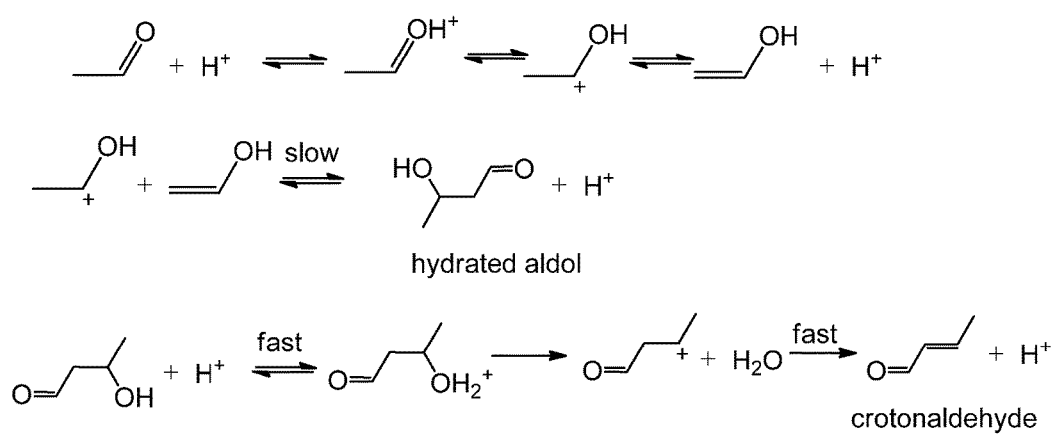
FIG. 11 depicts a scheme showing acid-catalyzed aldol condensation of acetaldehyde.

As is seen in FIG. 5, initial acetaldehyde (m/z=44, b.p.=20° C.) is almost entirely (over 97%) converted to crotonaldehyde (m/z=70, b.p.=104° C.) (see FIG. 11), ethyl acetate (m/z=88, b.p.=77.1° C.), 2-methyl-2-pentenal (m/z=98, b.p.=133-134° C.), 3-hydroxy-2-methylpentanal (m/z=116, b.p.=180.5° C.), unsaturated aldehyde products of metaldehyde (aldehyde tetramer) dehydration (m/z=158, b.p.>170° C.) and other products of higher molecular weight. Over the time of measurements, molecular weight of the products further increased. Notably, the boiling points of aldol condensation products and their dehydration show that these products are a lot less volatile than the initial acetaldehyde. Eventually, polymerization of acetaldehyde catalyzed by matrices was observed to produce viscous polymeric liquids.

Example 7

Catalysis of Reactions Between Aldehyde and Naphthol

Aldehydes and phenols such as naphthol are both carcinogenic products of the tobacco pyrolysis occurring during smoking and are found in tar and smoke (both vapors and particulates). In certain embodiments, the present invention discloses matrices that catalyze reactions between aldehydes and naphthols with the formation of non-volatile products. In the present Example, reactions between exemplary benzaldehyde and carcinogenic 2-naphthol catalyzed by porous matrices of the present invention are disclosed. Without being bound by any theory, the reaction is illustrated in FIG. 6.

The reaction was conducted as follows: A finely powdered aliquot of 2-naphthol (144 mg, 1.0 mmol) was mixed with 53 mg (0.5 mmol) of benzaldehyde and a measured amount of catalyst powder and the mixture, in a sealed stirred glass vial, was microwaved at a given temperature ranging from 60 to 90° C. for 2 to 10 min using 300 mW power under constant stirring. A rapid dissolution of 2-naphthol in benzaldehyde was observed at T>60° C. At a given time, the contents of the vial were placed on dry ice and dissolved in 2 mL of deuterated THF or methanol, centrifuged at 15,000 g for 30 s and the supernatant solutions were kept on dry ice until $^1$H NMR spectra were recorded. The separated catalyst was rinsed with methanol three times, dried under vacuum and weighed. No side reactions such as hemiacetal or hemiketal formation with $CD_3OD$ were detectable under these conditions. For the reaction yield measurement, the product separated from the solid catalyst in THF was dried under vacuum, dissolved in ethanol at 75° C. and the solution was chilled to 0° C. The ensued crystals of the dibenzoxanthene product were dried under vacuum and weighed to afford the reaction yield, which was calculated as a ratio of the actual product yield to the calculated one, based on the stoichiometry of the reaction.

Product characterization after recrystallization. $^1$H NMR (400 MHz, THF-$d_8$) $\delta_H$: 5.0 (1H, —CH), 7.08 (2H, naphthalene), 7.21-7.31 (5H, benzene), 7.47 (4H, naphthalene), 7.75 (2H, naphthalene), 7.81 (2H, naphthalene), 8.17 (2H, naphthalene). $^{13}$C NMR (100 MHz, $CDCl_3$) $\delta_C$: 45.3, 115.5, 118.8, 123.2, 126.7, 127.2, 128.4, 129.7, 133.5, 138.6, 153.6. Melting temperature, 181° C. Anal. Calcd. for $C_{27}H_{18}O$: C, 90.47; H, 5.06; Found: C, 90.35; H, 5.07.

The results of catalysis are shown in FIG. 9.

As is seen in FIG. 9, porous matrices of MIL101 containing PTA almost completely and rapidly converted benzaldehyde and 2-naphthol into non-volatile (solid, mp. 183° C.) product.

Example 8

Condensation of Acetaldehyde and Phenol

The reactions between acetaldehyde and phenol in deuterated THF (THF-$d_8$) were followed by $^1$H NMR spectroscopy, with the reactions conducted in triplicate at 25° C. Initial concentrations of phenol and acetaldehyde were $C_{pi}$=0.165 or 0.33 M and $C_{a0}$=0.33 M, respectively. In a typical experiment, phenol (188 mg, 2 mmol) and 10 mg of powdered catalyst were dissolved/suspended in THF-$d_8$ (2 mL), and 38 μL of acetaldehyde (previously chilled at 0° C.) were injected into the reaction mixture through a syringe. By varying MIL101/PTA concentration, we conducted a series of control measurements to establish an optimum catalyst concentration. Addition of 5 mg MIL101/PTA$_{imp}$ or MIL101/PTA$_{ja}$ into the initial acetaldehyde/phenol/THF-$d_8$ reaction mixture resulted in 1.1- to 1.6-fold lower conversion within 30 to 60 min than with 10 mg of the corresponding catalyst species, whereas addition of 20 mg did not change the reaction rate under otherwise identical conditions. Therefore, all further studies, except for stability studies, were conducted with 10 mg catalyst addition. All catalysts were kept under vacuum ($10^{-5}$ Torr) prior to the reactions. The reaction mixture was kept at 25° C. in a sealed 7-mL glass vial vigorously stirred at 800 rpm by a small magnetic bar. While phosphotungstic acid completely dissolved in THF, thus resulting in a homogeneous catalytic reaction, particles of MIL-101 and MIL101/PTA formed suspensions and therefore, in these cases the catalysis was heterogeneous. Samples (350 μL) were withdrawn from the vials intermittently, diluted 2-fold by THF-$d_8$ and centrifuged for 30 s at 14,000×g to remove the catalyst. The catalyst was returned to the vial. $^1$H NMR spectra of the clear supernatant were then recorded. The timepoint was taken as a median of the measurement duration. In the catalyst stability/reuse studies, the reactions were performed with 20 mg catalyst. The catalyst was removed from the reaction mixture by centrifugation (14,000 g, 30 s), the resulting tablet was dispersed in 3 mL THF with brief sonication and the particles were again separated by centrifugation. The procedure was repeated twice and the resulting particles were separated and dried under vacuum. The recycled catalyst was weighed and analyzed for W or Cr content by elemental analysis, conducted in duplicates. The catalyst recovery (wt %) was measured as 100× mass of catalyst in n-th cycle/initial mass of catalyst. The performance of the catalyst in each cycle was measured as described above.

Example 9

Reaction Between Benzaldehyde and Methanol

The reactions between benzaldehyde and methanol were conducted in triplicate at temperatures ranging from 25 to 55° C. Initial concentrations of methanol and benzaldehyde were $C_{mi}$=23.5 and $C_{bo}$=0.474 M, respectively. In a typical experiment, dry powdered catalyst (10 mg) was suspended in a mixture of methanol (6.7 mL, 166 mmol) and benzaldehyde (340 μL, 3.34 mmol) and the reaction commenced. All catalysts were kept under vacuum ($10^{-5}$ Torr) prior to the reactions. The reaction mixture was kept at 25° C. in a sealed 7-mL glass vial vigorously stirred at 800 rpm by a small magnetic bar. While phosphotungstic acid completely dissolved in methanol, particles of MIL-101 and MIL101/PTA were insoluble and no organic product such as terephthalic acid was detected to leach out. Samples (200 μL) were withdrawn from the vials intermittently and centrifuged for 30 s at 14,000 g to remove the catalyst. The catalyst was returned to the vial. $CDCl_3$ was added to the clear supernatant and $^1$H NMR spectra of the resulting solutions were then recorded. In cases when the samples could not be measured immediately after withdrawal from the reaction vials, they were placed into NMR tubes immediately after separation of the catalyst and dilution by $CDCl_3$; the tubes were kept on dry ice prior to the spectra measurement to quench the reaction fully. In the control experiment, no measurable change was observed in NMR spectra for 2 days in samples kept under such conditions. As in the case of acetaldehyde-phenol reaction, by varying MIL101/PTA concentration, we attempted to establish an optimum catalyst concentration. Addition of 5 mg MIL101/PTA$_{imp}$ or MIL101/PTA$_{ja}$ into the initial benzaldehyde/methanol reaction mixture resulted in 1.5- to 1.8-fold lower conversion within 30 to 60 min than with 10 mg of the corresponding catalyst species, whereas addition of 20 mg did not change the reaction rate under otherwise identical conditions. Therefore, all further studies were conducted with 10 mg catalyst addition, except for stability studies wherein 20 mg of the catalyst were used. For recycling, the catalyst removed by centrifugation from the reaction mixture was washed with THF and chilled methanol twice, dried under vacuum and weighed. Other stability parameters were measured as described above for the acetaldehyde-phenol reactions.

Benzaldehyde dimethyl acetal obtained in reaction catalyzed by MIL101/PTA$_{ja}$ followed by the product purification by flash chromatography on silica gel was observed to be a brownish paste material. $^1$H NMR (CDCl3): d=3.37 (s, 6 H), 5.42 (s, 1 H), 7.34-7.42 (m, 3H), 7.47-7.49 (m, 2 H). 13C NMR (CDCl3): d=52.3, 102.7, 126.2, 127.8, 128.0, 137.6.

Example 10

Characterization of Catalysts

MOF surface area and pore parameters were measured using a Micromeritics' ASAP® 2020 Accelerated Surface Area and Porosimetry Analyzer (Micromeritics Corp., Norcross, Ga.). Thermogravimetric Analysis (TGA) was conducted using a Q5000IR thermogravimetric analyzer (TA Instruments, Inc.). Samples were subjected to heating scans (20° C./min) in nitrogen atmosphere and in a temperature ramp mode. $^1$H and $^{13}$C NMR spectra were collected at 25±0.5° C. using a Bruker Avance-400 spectrometer operating at 400.01 and 100 MHz, respectively. Particle size distribution in MOF suspensions in methanol was measured using a ZetaPALS instrument (Brookhaven Instruments Corp.). Elemental analysis was conducted in a commercial laboratory.

In the present study, MIL-101 framework was synthesized solvothermically in deionized water, without addition of toxic and corrosive hydrofluoric acid that is typically present in the MIL-101. Férey, G. et al. Science 2005, 309, 2040-2042. Despite of the absence of HF, the crystal structure of MIL-101 in the present work corresponds to the one previously published. Doping of the MIL-101 porous structure with PTA ions results in robust particles that possess 4- to 5-fold lesser surface area than the original MOF; a significant portion of the pores is occupied by the PTA. Kegginanion of PTA possesses relatively large size (ca. 1.3 nm diameter and 2.25 nm$^3$ volume), so only the large cages of MIL-101 (3.6-nm diameter, FIG. 10) can host it. Ferey, G. et al. showed that each cage can accept up to five Keggin ions, representing 50% of the volume of the cage. Crystals grown as a result of joint autoclaving of the MIL-101 components and PTA resulted in particles sized 5- to 25-fold larger than those of the original MIL-101 or MIL101/PTA. Despite of the larger particle size, as shown below, the catalytic activity of the MIL101/PTA$_{ja}$ was virtually the same as the one of the MIL101/PTA$_{imp}$ with its smaller particles, indicating that the mass transport through the MOF pores was not limiting the activity.

Example 11

Reaction Between Acetaldehyde and Phenol

Kinetics of the condensation reaction between acetaldehyde and phenol at room temperature was studied by $^1$H NMR. Acetaldehyde is readily miscible with most organic solvents as well as phenol at ambient temperatures. However, in the presence of the catalyst, the exothermic aldehyde-phenol condensation is extremely rapid. The rise of temperature causes further increase in the reaction rate, which in turn causes a further temperature rise. As in the industrial processes of novolak resin production, we needed to utilize a non-reactive diluent as a means of cooling. Deuterated tetrahydrofuran (THF-$d_8$), which also served as an NMR lock, appeared to be an efficient diluent under chosen conditions, which afforded no detectable spike of temperature upon addition of acetaldehyde into the reaction mixture.

Figure 12:
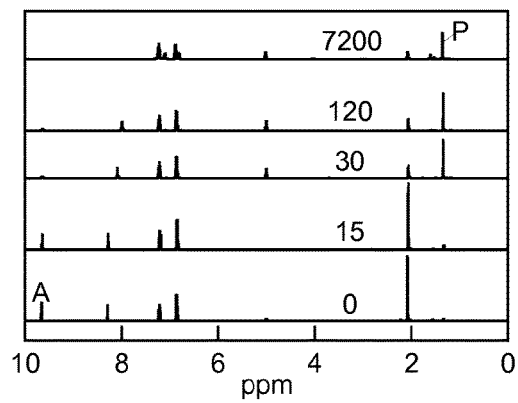
FIG. 12 depicts typical $^1$H NMR spectra representing the kinetics of the acetaldehyde and phenol condensation reaction catalyzed by MIL-101/PTA$_{ja}$ in THF-$d_8$ at 25° C. $C_{a0}/C_{p0}$=2:1 (mol/mol). Numbers stand for time in minutes since the reaction commencement. Letters A and P indicate the aldehyde (substrate) and product signals, respectively.

Typical $^1$NMR spectra representing the kinetics of the acetaldehyde and phenol condensation reaction catalyzed by MIL101/PTA$_{ja}$ in THF-d$_8$ at 25° C. are shown in FIG. 12. As is seen in FIG. 12, in the course of the reaction, the signal of the aldehyde group proton (—HC=O) at 9.7 ppm disappeared, while a strong signal of the methyl groups belonging to the ethylidene links between phenolic rings of the condensate product (—CHCH$_3$) appeared at 1.34 ppm and grew. These signals were a good reference for calculation of the aldehyde conversion (F), which was obtained from the expression $$F = \frac{0.33 I_{1.3}}{I_{9.7} + 0.33 I_{1.3}} \quad (1)$$

where $I_{1.3}$ and $I_{9.7}$ are relative integrations of the corresponding methyl and aldehyde protons, respectively, measured at time t.

The positions of the triplet centered at 7.2 ppm (two meta-position protons in phenol and products) and multiplet centered at 6.9 ppm (two ortho- and one para-positioned protons in phenol rings) were independent of the solvents used in the present study and did not change as the reaction proceeded. It is interesting to observe that the positions of the signals corresponding to the phenolic hydroxyl groups in the areas 7.9-8.3 and 5 ppm were labile, depending on the extent of the reaction. Previous studies of the model phenol-aldehyde oligomers documented that the chemical shifts of the phenol hydroxyls are highly sensitive of the formation of intramolecular complexes, wherein phenolic and forming methylolic hydroxyls form hydrogen bonds, resulting in changes of chemical shifts ($\delta_{OH}$) of up to 3 ppm. Formation and dissociation of such complexes explains the observed changes in $\delta_{OH}$.

Figure 13:
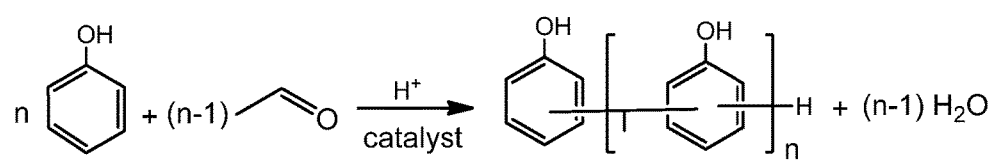
FIG. 13 depicts the Baeyer condensation of acetaldehyde and phenol.

The overall reaction of the acetaldehyde-phenol condensation is shown in FIG. 13.

In the FIG. 13, we deliberately did not specify the position of the methylene bridges between the phenol rings, as both ortho- and para-positions of the aromatic phenol ring possess the same reactivity in acid-catalyzed reactions. It is possible, however, to obtain all-ortho phenol-acetaldehyde novolac resins with uniform constitution in other catalytic reactions such as bromomagnesium ion mediated reaction of phenol with acetaldehyde derivatives.

From the formal definition of a reaction rate, we can define the rate of the condensation (FIG. 13) as $r = k C_p^\alpha C_a^\beta$, where $C_p$ and $C_a$ is the phenol and acetaldehyde concentration, respectively. Assuming that —OH group does not react, the change in the aldehyde concentration with time is as follows:

$$-\frac{dCa}{dt} = k_1 C_{pp} + k_2 C_{po} C_a$$

where $C_{pp}$ and $C_{po}$ is the total number of the para- and ortho positions, respectively, available for reaction.

Approximating $k_1 = k_2 = k$, we obtain $$-\frac{dC_a}{dt} = k(C_{pp} + C_{po}) C_a.$$

The concentration of reacted aldehyde at a given time is $C_{a0} - C_a$, where $C_{a0}$ is the initial aldehyde concentration. The total concentration of the remaining ortho- and para-positions of phenol are then found from the expression $C_{pp} + C_{po} = 3 C_{pi} - C_{a0} + C_a$. Herein, $C_{pi}$ is the initial phenol concentration.

The rate expression can then be written as follows:

$$-\frac{dC_a}{dt} = k(3 C_{pi} - C_{a0} + C_a) C_a$$

Denoting $q = (3 C_{pi} - C_{a0})$, the above expression becomes $$\frac{dC_a}{(q + C_a) C_a} = -k dt,$$

which after integration results in the following relation:

$$\ln \frac{C_a}{q + C_a} = \ln \frac{C_a}{q + C_{a0}} - kqt.$$

Thus, expressing the initial reaction results in the coordinates $$P = \frac{\ln C_a}{q + C_{a0}} - \frac{\ln C_a}{q + C_a} \text{ vs time} \quad (2)$$

we will obtain a straight line with a slope proportional to kq and, hence, arrive at an estimate of the reaction rate constant, k.

Figure 14:
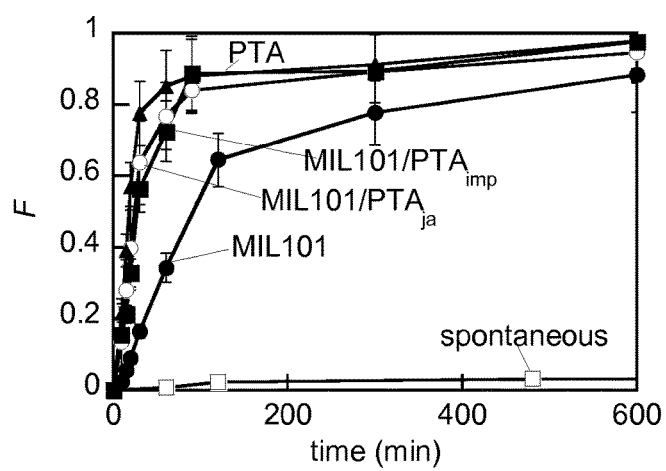
FIG. 14 depicts acetaldehyde conversion (F) vs time in the acetaldehyde-phenol (A-P) condensation reaction in deuterated THF. Initial acetaldehyde and phenol concentrations were $C_{a0}=C_{pi}$=0.33 M. T=25° C. For F definition, see equation (1).

As is seen in FIG. 14, the reaction catalyzed by PTA, MIL101/PTA and MIL101 proceeded with considerable rates in the first 30 min, at which point over 50% of the initial acetaldehyde were reacted. Complete conversion of acetaldehyde in the catalyzed reactions was reached within approximately 5 days. Spontaneous reaction without any catalyst added resulted in only ca. 5% conversion after 5 days at room temperature. The rate constant of the initial reaction was measured by expressing the time-dependent acetaldehyde concentration function (P) vs time (equation (2)) as shown in FIG. 15.

The slope of the linear fits ($R^2 > 0.96$ in all cases) yielded the acetaldehyde-phenol condensation rate constants, k, values of which are collected in FIG. 16, along with the catalyst turnover number (TON) and frequency (TOF) values. The TOF was obtained from the initial slope of the time-dependent concentration of the converted aldehyde $C^c_a / t = (C_{a0} - C_{a0} F)/t$ and effective catalyst concentration ($C_{cat}$):

$$\text{TOF} = (C_{a0} / C_{cat})(\Delta F / \Delta t) \quad (3)$$

Similarly, the reaction half-life was calculated from the expression $t_{1/2} = \ln(2)/(\Delta F/\Delta t)$.

In the case of MIL-101 without PTA, we assumed that total concentration of the Brønsted and Lewis acid sites (~2 mmol/g), rather than the concentration of coordinatively unsaturated cites in MIL-101 (0.7 mmol/g), provides an adequate estimate of the catalytic sites concentration. This value was used in $C_{cat}$ calculation.

Example 12

Acetalization of Benzaldehyde with Methanol

The reaction of acetalization of benzaldehyde (FIG. 17) using excess methanol with the formation of benzaldehydedimethyl acetal was readily followed by $^1$H NMR, which enabled measurement of the reaction kinetics (FIG. 18).

As is seen in FIG. 18, in the course of the reaction, the signal of the benzaldehyde proton (—HC=O) at 9.9 ppm disappeared, while signals at 5.3 ppm of the methine group located α to both —C—O— as well as benzyl group and 6 protons of the methyl groups of the dimethyl acetal at 3.3 ppm (—CH—O—CH$_3$) appeared and grew. The aldehyde conversion (F) in this reaction was obtained from the expression $$F = \frac{I_{5.3}}{I_{9.9} + I_{5.3}}, \qquad (4)$$

where $I_{5.3}$ and $I_{9.9}$ are relative integrations of the corresponding methylene and aldehyde protons, respectively, measured at time t.

While the position of the signals of the methyl groups of methanol (3.38 ppm) remained constant throughout the course of the reaction, the position of the hydroxyl group signals varied in the range 3.7-4.3 ppm (FIG. 18). The $\delta_{OH}$ of the hydroxyl groups of methanol is known to depend strongly on the extent of the hydrogen bond formation, which depends of the solvent. In particular, the chemical shift of the —OH signal in the methanol-chloroform mixtures varies with the solvent composition in the 1.5-4.6 ppm range due to the hydrogen bonding between the methanol and the solvent. Slight variations of the methanol concentration in CDCl$_3$ and appearance of water, with its strong propensity for H-bonding, in the course of the reaction, lead to the changes of the methanolic —OH chemical shift.

The kinetics and thermodynamics of the reaction of aldehyde with alkanols over solid acid, heterogeneous catalysts, such as zeolites, clays and ion exchange resins, have been studied. A reaction mechanism for the alkanol-aldehyde reaction involving heterogeneous catalysis was proposed, consisting of three elementary steps: (i) hemiacetal formation from the adsorbed aldehyde and the alcohol; (ii) formation of water (a limiting step), and (iii) formation of the acetal. Detailed studies involving the monitoring of the time-dependent activities of all reactants in the synthesis of acetaldehyde dimethylacetal on the acid resin Amberlyst-15 in a batch reactor revealed a kinetic law and rate constants of the reaction, and accounted for the acetaldehyde volatility. However, to the best of our knowledge, no rate constants have been reported in the case of arylaldehyde acetals, despite the reports on the formation of dimethyl acetals using trimethyl orthoformate as reagent and indium-layered MOF as catalysts and from benzaldehyde and methanol using Cu(II), Fe(II) and Al benzene di- and tricarboxylate MOFs as catalysts.

In the present work, we set out to evaluate the kinetics of the overall benzaldehyde dimethyl acetal formation reaction catalyzed by MIL-101 and its composites with PTA and compare the performance of these materials with those of the previously reported MOF catalysts. We avoided the description of the (unknown) elementary steps.

Considering the 50-fold molar excess of methanol over benzaldehyde, the change of benzaldehyde concentration ($C_b$) with time can be described by a pseudo-first order rate equation:

$$-\frac{dC_b}{dt} = k_{obs}C_b$$

From the integrated form of the above equation being $$\ln(C_{bt}/C_{b0}) = \ln(1-F) = -k_{obs}t, \qquad (5)$$

we can obtain $k_{obs}$ using experimental $^1$H NMR results such as F vs time data, wherein F is obtained from eqn(4). The kinetics shown in FIG. 19 depict rapid conversion of benzaldehyde to its dimethyl acetal in the presence of PTA and its composites with MIL-101. The datapoints obtained within the first 60 min appeared to be straight lines (R$^2$>0.98 in all cases) in coordinates of eqn(5), enabling estimates of $k_{obs}$, the reaction half-time $t_{1/2}$=ln(2)/$k_{obs}$, and the turnover frequency TOF=$C_{b0}k_{obs}/C_{cat}$. These parameters are collected in FIG. 20. Importantly, a very low (<5 mol %) benzaldehyde conversion was observed without the catalysts, while a complete conversion was observed within 48 h in the presence of all catalysts and 93-95 mol % conversion within 24 h in reactions catalyzed by the MIL101/PTA composites as well as PTA. With MIL-101, the conversion reached 80 mol % after 24 h. The catalytic turnover number (TON=$C_{b0}$×Conversion/$C_{cat}$) can be calculated. Calculated per total concentration of the Bronsted and Lewis acid cites per L of the suspension, at 80% conversion after 24 h we obtain TON of ca. 140 with MIL-101 (FIG. 16). The above estimates of TON indicate that MIL-101 is at least 10-fold more efficient a catalyst compared to Cu$_3$(BTC)$_2$ MOF. Importantly, the reaction rates were 5-fold and TON values were 20-fold higher with the MIL101/PTA composites compared to the unmodified MIL-101, indicating that the presence of a strong heteropolyacid in these composites enhanced the catalysis efficiency drastically.

Example 13

Catalyst Recovery and Reuse

From the practical standpoint, maximum catalyst productivity, or kg of product produced per kg of catalyst, is the measure of a catalyst's performance merit. Highly stable catalysts that do not become deactivated easily during the reaction exhibit high productivity and many kg of product can be produced per kg of catalyst. Productivity data using MOFs as catalysts that are necessary to determine the economics of the process and the possibility to develop industrial processes based on MOF catalysis are available in only a few reports. In the present work, we accessed the stability of the MIL-101 and MIL101/PTA catalysts within four cycles of the alcohol-aldehyde reactions. The stability parameters were (i) overall catalyst recovery by mass, (ii) structural stability in terms of PTA (Keggin ion) content in the MIL101/PTA composites or Cr content in MIL-101, and (iii) performance in terms of kinetic rate constants in each cycle. The results of the recovery and reuse studies are collected in FIG. 21. As is seen, the loss of the catalyst mass over 4 cycles was approximately 10 wt % for all tested catalysts. This loss is attributable to the incomplete recovery of the catalyst after separation by centrifugation, due to minute fraction dissolving in methanol in the process of catalyst washing and some small catalyst quantities staying on the walls of the centrifuge tubes. These losses essentially stopped after the third cycle, and so did the losses of the PTA leaching out of the MIL-101 framework. We have previously demonstrated by XRD methods that prolonged and repeated exposure of the MIL-101 and its composites with PTA to organic solvents such as methanol, THF and some others in the temperature range from ambient to 90° C. did not induce any changes to the framework crystal structure. These data, along with essentially unchanged reaction rate constants (FIG. 21) demonstrate outstanding stability of the MOF catalysts. In 4 cycles, 20 mg of the MIL/PTA catalyst converted approximately 750 mg of phenol and 140 mg of acetaldehyde, or 1.35 g of benzaldehyde. This finding indicates high catalyst performance merit.

Example 14

MOF Synthesis $NH_2$-MIL-101 (Al). A solution of aluminum chloride hexahydrate ($AlCl_3.6H_2O$, 0.51 g, 2 mmol) and 2-ATA (HOOC—$C_6H_3NH_2$—COOH, 0.56 g, 3 mmol) in DMF (99.9%, 40 mL) was kept at 130° C. for 72 h in a Teflon-lined autoclave bomb. Then the solids were separated from the solution by centrifugation (5000 g, 10 min) and washed with DMF under sonication for 20 min. This was followed by washing with methanol at room temperature, washing with excess hot (70° C.) methanol for 5 h, and drying under vacuum at 80° C. until constant weight was achieved. Elemental analysis, Calcd. (for unit cell, $Al_{816}C_{6528}H_{4896}N_{816}O_{4352}$): Al, 11.8; N, 6.13%; Found: Al, 12.1; N, 6.34%. The resulting MOF was designated $NH_2MIL101(Al)_{auto}$.

$NH_2$-MIL-53(Al). This material was synthesized by thermal treatment of the MOF components by either autoclaving or applying microwave. In the autoclaving method, a solution of aluminum chloride hexahydrate ($AlCl_3.6H_2O$, 99%, 2.55 g, 10 mmol) and 2-ATA (2.8 g, 15.5 mmol) in DMF (99.9%, 40 mL) was kept at 130° C. for 72 h in a Teflon-lined autoclave bomb. The solids were separated from the solution by centrifugation (5,000 g, 10 min) and washed with DMF under sonication for 20 min. This was followed by washing with methanol at room temperature, washing with excess hot (70° C.) methanol for 5 h, and drying under vacuum at 80° C. until constant weight was achieved. Elemental analysis, Calcd. (for unit cell, $Al_4C_{32}H_{24}N_4O_{20}$): Al, 12.1; N, 6.27%; Found: Al, 12.7; N, 6.75%. The resulting MOF was designated $NH_2MIL53(Al)_{auto}$.

In the microwaving method, a solution of aluminum chloride hexahydrate ($AlCl_3.6H_2O$, 0.51 g, 2 mmol) and 2-ATA (0.56 g, 3 mmol) in DMF (99.9%, 40 mL) was placed in a microwave oven (Discover SP-D, CEM Corp.) and was kept at 130° C. for 1 h using microwave power of 300 mW. The solids were separated from the solution by centrifugation (5,000 g, 10 min) and washed with DMF under sonication for 20 min. This was followed by washing with methanol at room temperature, washing with excess hot (70° C.) methanol for 5 h, and drying under vacuum at 80° C. until constant weight was achieved. Elemental analysis, Calcd. (for unit cell, $Al_4C_{32}H_{24}N_4O_{20}$): Al, 12.1; N, 6.27%; Found: Al, 12.1; N, 6.30%. The resulting MOF was designated $NH_2MIL53(Al)_{auto}$.

Example 15

MOF Structure

Based on XRD data and with the help of CrystalMaker® (CrystalMaker Software, Ltd.) and SpartanModel (Wavefunction, Inc.) software, representations of the 3-D structures of the $NH_2$-MIL-101(Al) and $NH_2$-MIL-53(Al) MOF were prepared, as shown in FIG. 22.

The functional MOF materials were characterized by high resolution TEM, nitrogen adsorption isotherms at 77 K, and TGA/DSC in a nitrogen atmosphere with temperatures up to 1200° C.

The specific BET surface areas for the $NH_2$-MIL-101(Al) and $NH_2$-MIL-53(Al) samples were 1920 and 780 $m^2/g$, respectively. Incorporation of phosphotungstic acid (PTA) into the MOF reduced the BET surface area 4- to 5-fold when it is introduced to the MOF pores. Thermogravimetric analysis (TGA/DSC) of $NH_2$-MIL-101(Al) and $NH_2$-MIL-53(Al) in nitrogen demonstrated release up to 6 wt % of solvent at temperatures<100° C. The MOF materials decomposed only at temperatures above 450° C., thus demonstrating remarkable thermal stability.

Example 16

Amino-containing MOF Functionalized with PTA

Previous results indicated that phosphotungstic acid (PTA) appeared to be a strong promoter of the aldol condensation of aldehydes. So, the effects of PTA incorporation into the amino-containing MOF was investigated. Two methods of PTA incorporation into the MOF were explored: impregnation of the already prepared MOF with aqueous solution of PTA and heating of a mixture of the MOF components and PTA (joint heating). The latter technique was explored by two methods of the heat supply: conventional autoclave oven and microwave.

Impregnation

In the "impregnation" method,[3] 0.5 g of dry $NH_2$-MIL-101(Al) synthesized in autoclave as described above was suspended in methanolic solution of phosphotungstic acid (0.5 g in 5 mL). The suspension was sonicated and shaken at 300 rpm for 8 h. The solids were separated by centrifugation, repeatedly washed by methanol and deionized water (pH 6.2) and dried under vacuum. The resulting MOF was designated $NH_2MIL101(Al/PTA)_{imp}$. Elemental analysis (wt %): C, 29.1; Al, 8.20; W, 23.6. Based on the elemental analysis results and molecular weight of hydrated PTA ($H_3PW_{12}O_{40}.6H_2O$, W content, 73.8%; MW, 2988 Da), we estimated the PTA content of the $NH_2MIL101(Al)/PTA_{imp}$ materials to be approximately 107 µmol/g of dry powder, or 32 wt %.

Impregnation, washing and drying procedure identical to the one above was performed with MOF $NH_2MIL53(Al)_{auto}$ resulting from the autoclaving preparation method. Elemental analysis (wt %): C, 31.8; Al, 8.92; W, 21.4. Based on the elemental analysis results and molecular weight of hydrated PTA ($H_3PW_{12}O_{40}.6H_2O$, W content, 73.8%; MW, 2988 Da), we estimated the PTA content of the $NH_2MIL53(Al)/PTA_{imp}$ materials to be approximately 97 tmol/g of dry powder, or 29 wt %.

The content of hydrated PTA, or P, was calculated according to the formula, P (µmol/g)=1×10$^6$ (W content in the hybrid material, %)/(2988×73.8%).

Joint Heating

To obtain the MOF/PTA hybrid by a solvothermal method involving autoclave oven, the following procedure was followed.[4] Aluminum chloride hexahydrate (0.51 g, 2.1 mmol), 2-amino terephthalic acid (0.56 g, 3.1 mmol) and phosphotungstic acid hydrate (250 mg, 0.086 mmol) were dissolved in DMF (30 mL) and the mixture was kept without stirring at 130° C. in a Teflon-lined autoclave bomb for 72 h. The resultant solids were separated by centrifugation, kept in boiling methanol at 70° C. overnight, separated, washed with acetone and dried at 80° C. overnight. The resulting MOF was designated $NH_2MOF(Al)/PTA_{auto}$. It must be noted that the XRD pattern of the solid structure resulting from the autoclaving of the MOF components and PTA did not resemble that of $NH_2$-MIL-101(Al) or $NH_2$-MIL-53(Al), and hence, we used the above designation.

To obtain the MOF/PTA hybrid by a solvothermal method involving microwaving of a mixture of the MOF components and PTA, $AlCl_3.6H_2O$ (507 mg, 2.1 mmol), 2-aminoterephthalic acid (564 mg, 3.1 mmol) and PTA hydrate (985 mg, 0.34 mmol) were dissolved in anhydrous N,N-dimethylformamide (DMF) and the resulting solution was brought, under constant stirring, from ambient temperature to 130° C. within 5 min followed by 1 h heating at 130° C. enabled by 300-mW power supply. The resulting solids were separated by centrifugation, kept in boiling methanol at 70° C. overnight, separated and dried at 70° C. until constant weight. The resulting MOF was designated $NH_2MIL53(Al)/PTA_{MW}$.

Example 17

Amino-containing MOF Functionalized by Al-i-Pro$_3$ $NH_2MIL101(Al)_{auto}$ or $NH_2MIL101(Al)_{MW}$ MOF (0.88 g) was mixed with a solution of 0.88 g (4.3 mmol) of aluminum isopropoxide (Al-i-Pr$_{0.3}$) in 10 mL hexane. The suspension was briefly sonicated and then dried at 70° C. in an oven. The resulting dry powder was suspended with excess hexane with brief sonication, separated by centrifugation (5000 rpm) and dried.

Example 18

Performance of MOF/PTA and MOF/Al-i-Pro3 Hybrids in Capture and Chemical Conversion of Acetaldehyde Vapors Capture and Condensation of Acetaldehyde Vapors on MOF Materials For acetaldehyde capture, borosilicate glass vials, each containing a weighed amount of dry powder of a solid sample were placed next to an open 5-mL wide mouth jar containing 2 g of liquid acetaldehyde, initially poured into the dish at −20° C. Both the vials and the jar were situated in a small glass desiccator, which was sealed immediately after pouring liquid acetaldehyde into the jar. Acetaldehyde rapidly evaporated from the Petri dish at room temperature, with the vapors contained inside of the sealed desiccator. The open vials were kept in the desiccator for 24 h to 14 days at room temperature, while weighing the uptake periodically by withdrawing the vials from the desiccator, immediately sealing them and measuring weight. Liquid acetaldehyde was added into the jar within the desiccator each time the desiccator was open for the samples withdrawal, to maintain the saturated vapor atmosphere inside the dessicator. Equilibrium weight uptake was reached after 24 h, at which point no further weight increase of the vials was observed. Small samples (0.1 mL) of liquid formed in the vials were withdrawn intermittently. Rapid change of color from white to yellow to brown to black was observed in the liquid condensed in the vials containing $NH_2MIL101(Al)/PTA_{imp}$ and $NH_2MIL53(Al)/PTA_{imp}$ samples. The samples were prepared and weight uptake measured in triplicates. The weight uptake was calculated as WU, %=100×(Sample weight after equilibration−Initial sample weight)/Initial sample weight.

FIG. 23 shows acateldehyde vapor uptake by MOF samples after 24 h at 25° C. BET area of the dry MOF samples is shown as well. As is seen, no correlation is found between the BET area and the vapor uptake by the samples, which indicates that the vapor uptake depended on the chemical nature of the samples. BET area of the MOF was lowered 4-8-fold by incorporation of PTA or Al-i-Pr$_{0.3}$ molecules into the MOF pores. All samples exhibited a significant uptake of the acetaldehyde from its vapor phase, exceeding 50 wt % in all cases. The uptake by $NH_2MIL101(Al)/PTA_{imp}$ and $NH_2MIL53(Al)/PTA_{imp}$ was especially pronounced, exceeding 275 wt %. The synthesis of MOF/PTA hybrids by impregnation without heating allowed for the PTA to maintain its superacidic properties, thus acting as efficient catalyst of repeated aldol condensation (FIG. 24) causing eventual formation of polymeric products.

Rapid formation of liquid condensation products eliminated the adsorbed acetaldehyde from the MOF surface, thus driving further adsorption and increasing the weight uptake (see FIG. 23).

Analysis of Condensation Products

The vapor condensed on the samples of the study was analyzed for composition by Matrix Assisted Laser Desorption/Ionization Time of Flight (MALDI-TOF) mass spectrometry using an Applied Biosystems Model Voyager DE-STR spectrometer, with 2,5-dihydroxybenzoic acid (DBH) as a matrix. For analysis, the acetaldehyde products adsorbed on the solid matrix were extracted by tetrahydrofuran. The sample containing 20-30 mg of solid material was suspended in 0.5 mL THF and vortexed for 1-2 min. Then the solids were separated using a table-top centrifuge and the supernatant was diluted 50-fold by deionized water. Thus diluted extraction product (1 uL) was added to 1 uL of the matrix and spotted. The matrix consisted of 20 mg DHB, 500 uL acetonitrile, and 500 uL of 0.1 wt % trifluoroacetic acid.

Analysis of the reaction products by MALDI-TOF (FIG. 25) confirmed the chemical conversion of acetaldehyde by the MOF/PTA$_{imp}$ samples. After a few days of equilibration, no un-converted acetaldehyde was found in the extracts.

Analysis of Reaction Between MOF and Acetaldehyde

Reaction between the MOF matrix and adsorbed and condensed acetaldehyde vapor was studied as follows. MOF was dissolved in 20% NaOH/D$_2$O solvent forming transparent solution at 5 mg/mL MOF concentration. The solution was diluted 50-fold with deionized water and 1 uL was added to 1 μL DHB matrix; the mixture was spotted.

The results are shown in FIG. 26, which reveals formation of the imine products of reaction of acetaldehyde with the amino groups belonging to 2-aminoterephthalic acid of the MOF. The mechanism of the acid-catalyzed reaction between acetaldehyde and amino groups of MOF is shown in FIG. 27.

FIG. 27 also illustrates the rationale for the reduced reactivity of the MOF/PTA hybrids synthesized with the use of elevated temperature, which leads to reduction of the acidic functionality of PTA through Lewis acid (PTA)-amine (MOF) complexation. Immobilization of phosphotungstic acid on amine-grafted mesoporous materials is well-documented. The protons in the secondary structure of the heteropolyacids are readily exchanged with different cations or protonizable amines, without altering the Keggin anion structure dramatically. These materials exhibit a pseudoliquid phase behavior, where polar molecules like water, alcohols, amines enter into the bulk of the crystalline heteropolyacid, expanding or contracting the distance between the Keggin anions in the crystal lattice, while nonpolar molecules such as hydrocarbons only adsorb on the surface, without entering the bulk. However, on heating of the mixtures of PTA and MOF components, the PTA crystal structure undergoes dramatic changes, as evidenced by XRD patterns, and the heteropolyacid loses a significant fraction of its catalytic activity of aldol condensation of acetaldehyde.

Example 19

Immobilization of MOF Particles on Cellulose Acetate Fibers

Cellulose diacetate fibers from PMI were coated with MOF particles by spray-drying. The coating was performed by spraying fibers by a 1-10 wt % suspension of MOF in either 5 wt % solution of toluene diisocyanate (TDI) in THF or acetone. The spraying was conducted in a continuous stream of air, which rapidly dried the solvents. When TDi was applied the air-dried fibers/MOF materials were kept at 70° C. for 1 h, to partially cure (react) TDI with —OH groups of cellulose acetate. Upon contacting the solvents, the fibers partially dissolved, but the dissolution was limited by rapid solvent evaporation. MOF loading into the fibers varied, but was measured by TGA/DSC to reach up to 10 wt %. FIG. 28 shows SEM images of coated and uncoated fibers, to illustrate the outcome of the coating process.

Reactions between isocyanate and amino groups of MOF (FIG. 29) and between isocyanate and —OH groups of the fiber surface were uncovered using FTIR.

Example 20

Acetaldehyde Uptake by Unmodified and MOF-modified Fibers

Equilibrium acetaldehyde vapor uptake by CA fibers and their MOF-modified counterparts was studied analogously to the uptake by MOF (see above). Prior to the uptake experiments, all materials were subjected to the nitrogen adsorption measurement of their BET surface area. The results are shown in FIG. 30.

FIG. 30 demonstrates a positive correlation between the surface area and vapor uptake of these materials, with MOF coated on the fiber surface enhancing both the surface area and the vapor uptake.

INCORPORATION BY REFERENCE

The contents of the articles, patents, and patent applications, and all other documents and electronically available information mentioned or cited herein, are hereby incorporated by reference in their entirety to the same extent as if each individual publication was specifically and individually indicated to be incorporated by reference. Applicants reserve the right to physically incorporate into this application any and all materials and information from any such articles, patents, patent applications, or other physical and electronic documents.

EQUIVALENTS

The invention has been described broadly and generically herein. Those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention. Further, each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

We claim:

1. A smoking article, comprising a tobacco rod; and a filter element, comprising a hybrid metal-organic framework (MOF) matrix, and a fiber; wherein
    the hybrid MOF matrix comprises a dopant and a plurality of metal ions or clusters coordinated to a plurality of polydentate organic ligands selected from the group consisting of terephthalic acid, isophthalic acid, 2-aminoterephthalic acid, acetate-muconic acid, and a mixture thereof; wherein
        the dopant is selected from the group consisting of a nucleophilic amine, a polyoxometalate (POM) and a nucleophilic amine, phosphotungstic acid (PTA), and aluminum isopropoxide;
    the metal ion or cluster comprises Al, Cr, or Fe;
    the filter element reduces the quantity of a toxicant; and
    the filter element is attached to the tobacco rod.

2. The smoking article of claim 1, wherein the metal ion or cluster comprises Fe.

3. The smoking article of claim 1, wherein the polydentate organic ligand is selected from the group consisting of terephthalic acid, isophthalic acid, 2-aminoterephthalic acid, and a mixture of acetate-muconic acid and terephthalic acid.

4. The smoking article of claim 1, wherein the polydentate organic ligand is selected from the group consisting of terephthalic acid, 2-aminoterephthalic acid, and a mixture of acetate-muconic acid and terephthalic acid.

5. The smoking article of claim 1, wherein the metal ion or cluster comprises Al.

6. The smoking article of claim 1, wherein the metal ion or cluster comprises Cr.

7. The smoking article of claim 1, wherein the dopant is a nucleophilic amine.

8. The smoking article of claim 7, wherein the polydentate organic ligand is selected from the group consisting of terephthalic acid, isophthalic acid, 2-aminoterephthalic acid, and a mixture of acetate-muconic acid and terephthalic acid.

9. The smoking article of claim 8, wherein the metal ion or cluster comprises Fe.

10. The smoking article of claim 8, wherein the metal ion or cluster comprises Al.

11. The smoking article of claim 8, wherein the metal ion or cluster comprises Cr.

12. The smoking article of claim 7, wherein the nucleophilic amine is dimethylaminopyridine (DMAP).

13. The smoking article of claim 1, wherein the dopant is a polyoxometalate (POM) and a nucleophilic amine.

14. The smoking article of claim 13, wherein the polydentate organic ligand is selected from the group consisting of terephthalic acid, 2-aminoterephthalic acid, and a mixture of acetate-muconic acid and terephthalic acid.

15. The smoking article of claim 14, wherein the metal ion or cluster comprises Fe.

16. The smoking article of claim 14, wherein the metal ion or cluster comprises Al.

17. The smoking article of claim 14, wherein the metal ion or cluster comprises Cr.

18. The smoking article of claim 13, wherein the nucleophilic amine is dimethylaminopyridine (DMAP).

19. The smoking article of claim 1, wherein the dopant is phosphotungstic acid (PTA).

20. The smoking article of claim 1, wherein the dopant is aluminium isopropoxide.

\* \* \* \* \*